United States Patent
Grant et al.

(10) Patent No.: US 10,037,081 B2
(45) Date of Patent: Jul. 31, 2018

(54) SYSTEMS AND METHODS FOR HAPTIC FIDDLING

(71) Applicant: Immersion Corporation, San Jose, CA (US)

(72) Inventors: Danny Grant, Laval (CA); Vincent Levesque, Montreal (CA); Amaya Weddle, San Jose, CA (US); David Birnbaum, Oakland, CA (US); Juan Manuel Cruz-Hernandez, Montreal (CA); Jamal Saboune, Montreal (CA)

(73) Assignee: Immersion Corporation, San Jose, CA (US)

( * ) Notice: Subject to any disclaimer, the term of this patent is extended or adjusted under 35 U.S.C. 154(b) by 14 days.

(21) Appl. No.: 14/010,973

(22) Filed: Aug. 27, 2013

(65) Prior Publication Data

US 2015/0042573 A1    Feb. 12, 2015

Related U.S. Application Data

(60) Provisional application No. 61/864,844, filed on Aug. 12, 2013.

(51) Int. Cl.
*G06F 3/01*    (2006.01)
*G06F 3/041*   (2006.01)
*G06F 3/0488*  (2013.01)

(52) U.S. Cl.
CPC .............. *G06F 3/016* (2013.01); *G06F 3/041* (2013.01); *G06F 3/0488* (2013.01)

(58) Field of Classification Search
CPC .... G06F 3/016; G06F 3/0488; G06F 3/04883; G06F 2203/014; G06F 2203/04104;
(Continued)

(56) References Cited

U.S. PATENT DOCUMENTS

2006/0261982 A1* 11/2006 Kong ................ G06F 3/038
                                            341/22
2009/0102805 A1*  4/2009 Meijer .............. G06F 3/016
                                            345/173
(Continued)

FOREIGN PATENT DOCUMENTS

CN    101517514 A    8/2009
CN    102099766 A    6/2011
(Continued)

OTHER PUBLICATIONS

JP 2014-144199, "Office Action", dated Mar. 6, 2018, 6 pages.
(Continued)

*Primary Examiner* — Koosha Sharifi-Tafreshi
(74) *Attorney, Agent, or Firm* — Kilpatrick Townsend & Stockton LLP

(57) ABSTRACT

Systems and methods for haptic fiddling are disclosed. In one embodiment, a sensor signal indicating an interaction with an electronic device is received by the electronic device. In response to receiving the sensor signal, the electronic device may output an output signal. The output signal may be output to a display, a haptic output device, an audio device, and/or another output device. The output signal can correspond to a modality. After outputting the output signal, another sensor signal indicating another interaction with the electronic device may be received by the electronic device. This interaction may be associated with the previously-received interaction. In response to receiving this interaction, the electronic device may output another output signal to the same output device(s) and/or different output device(s). The second output signal may correspond to one or more different modalities than the previous output signal.

25 Claims, 10 Drawing Sheets

(58) Field of Classification Search
CPC ........... G06F 2203/04808; G06F 3/017; G06F 3/0414; G06F 3/04842; G06F 3/0346; G09G 5/006; G08B 6/00; A63F 13/285
USPC ...... 345/173, 158, 156; 340/407.1; 715/702, 715/863; 463/30
See application file for complete search history.

(56) References Cited

U.S. PATENT DOCUMENTS

| | | | |
|---|---|---|---|
| 2009/0280860 A1* | 11/2009 | Dahlke | G06F 3/016 455/556.1 |
| 2010/0013761 A1* | 1/2010 | Birnbaum et al. | 345/156 |
| 2010/0017759 A1* | 1/2010 | Birnbaum | G06F 1/1613 715/863 |
| 2010/0308983 A1 | 12/2010 | Conte et al. | |
| 2011/0163946 A1* | 7/2011 | Tartz | G06F 3/016 345/156 |
| 2011/0283241 A1* | 11/2011 | Miller | G06F 3/04883 715/863 |
| 2012/0329529 A1* | 12/2012 | van Der Raadt | G06F 1/1694 455/566 |
| 2013/0046046 A1 | 2/2013 | Sharma et al. | |
| 2014/0068624 A1* | 3/2014 | Fuller | G06F 9/5011 718/104 |
| 2014/0085221 A1* | 3/2014 | Kim | G06F 3/016 345/173 |
| 2014/0228077 A1* | 8/2014 | Xu | 455/566 |
| 2014/0267034 A1* | 9/2014 | Krulce | G06F 3/013 345/158 |
| 2014/0292674 A1* | 10/2014 | Lee | G09G 5/006 345/173 |

FOREIGN PATENT DOCUMENTS

| | | |
|---|---|---|
| CN | 102099767 A | 6/2011 |
| CN | 102362246 A | 2/2012 |
| JP | 2013-032932 | 2/2013 |
| JP | 2013-117951 | 6/2013 |

OTHER PUBLICATIONS

CN 201410366523.8, "Office Action", dated Mar. 2, 2018, 9 pages.
EP 14180576.2, "Communication Pursuant to Article 94(3) EPC", dated Feb. 23, 2018, 4 pages.

* cited by examiner

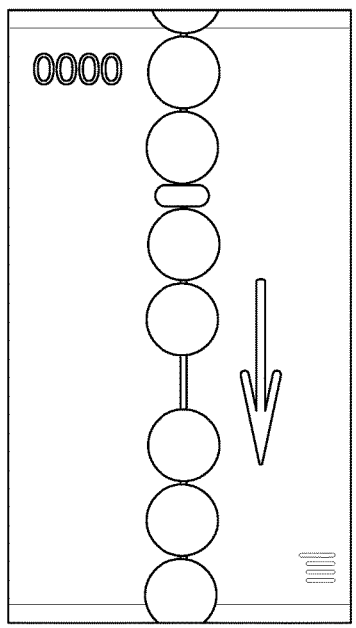 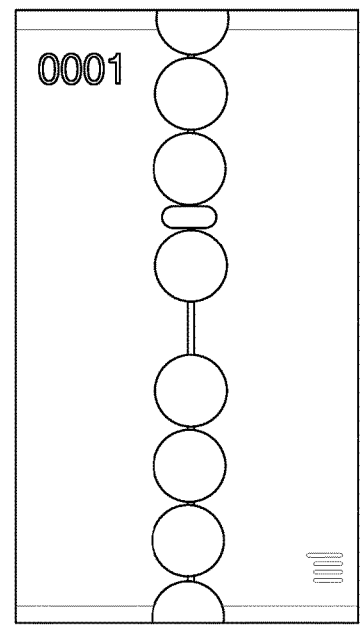
FIGURE 6A FIGURE 6B

SYSTEMS AND METHODS FOR HAPTIC FIDDLING

CROSS-REFERENCE TO RELATED APPLICATIONS

This application claims priority to U.S. Provisional Patent Application No. 61/864,844, filed Aug. 12, 2013, entitled "Systems and Methods for Haptic Fiddling," the entirety of which is hereby incorporated by reference.

FIELD

The present disclosure relates generally to systems and methods for haptic fiddling.

BACKGROUND

Traditionally, mechanical buttons have provided physical tactile sensations to the users of handheld mobile devices. However, with the increase in popularity of touch-sensitive surfaces (e.g., touch screens) on these devices, especially on mobile phones, the mechanical buttons are no longer present. Instead, haptic output devices may be included in such devices to output haptic effects that alert the user to various events.

SUMMARY

Embodiments provide systems and methods for haptic fiddling. For example, one disclosed method comprises receiving a first sensor signal from a sensor, the first sensor signal indicating a first interaction with an electronic device; in response to receiving the first sensor signal, outputting a first output signal, the first output signal corresponding to a first modality; after outputting the first output signal, receiving a second sensor signal from the sensor, the second sensor signal indicating a second interaction with the electronic device, the second interaction associated with the first interaction; and in response to receiving the second sensor signal, outputting a second output signal, the second output signal corresponding to a second modality and not corresponding to the first modality. In some embodiments, the first output signal and the second output signal are configured to convey analogous information to a user. In some embodiments, the first modality and the second modality are configured to convey the same and/or an analogous mental model to a user.

In another embodiment, a computer-readable medium comprises program code for: receiving a first sensor signal from a sensor, the first sensor signal indicating a first interaction with an electronic device; in response to receiving the first sensor signal, outputting a first output signal, the first output signal corresponding to a first modality; after outputting the first output signal, receiving a second sensor signal from the sensor, the second sensor signal indicating a second interaction with the electronic device, the second interaction associated with the first interaction; and in response to receiving the second sensor signal, outputting a second output signal, the second output signal corresponding to a second modality and not corresponding to the first modality. In some embodiments, the first output signal and the second output signal are configured to convey analogous information to a user. In some embodiments, the first modality and the second modality are configured to convey the same and/or an analogous mental model to a user.

In one embodiment, a system comprises an input device; a first output device; a second output device; and a processor in communication with the input device, the first output device, and the second output device. In an embodiment, the processor is configured for: receiving a first sensor signal from the input device, the first sensor signal indicating a first interaction with the input device; in response to receiving the first sensor signal, outputting a first output signal to at least the first output device, the first output signal corresponding to a first modality; after outputting the first output signal to the first output device, receiving a second sensor signal from the input device, the second sensor signal indicating a second interaction with the input device, the second interaction associated with the first interaction; and in response to receiving the second sensor signal, outputting a second output signal to at least the second output device, the second output signal corresponding to a second modality and not corresponding to the first modality. In some embodiments, the first output signal and the second output signal are configured to convey analogous information to a user. In some embodiments, the first modality and the second modality are configured to convey the same and/or an analogous mental model to a user.

These illustrative embodiments are mentioned not to limit or define the invention, but rather to provide examples to aid understanding thereof. Illustrative embodiments are discussed in the Detailed Description, which provides further description of the invention. Advantages offered by various embodiments of this invention may be further understood by examining this specification.

BRIEF DESCRIPTION OF THE DRAWINGS

The accompanying drawings, which are incorporated into and constitute a part of this specification, illustrate one or more examples of embodiments and, together with the description of example embodiments, serve to explain the principles and implementations of the embodiments.

FIG. 6A illustrates aspects of haptic fiddling in accordance with an embodiment;

FIG. 6B illustrates aspects of haptic fiddling in accordance with an embodiment;

DETAILED DESCRIPTION

Example embodiments are described herein in the context of systems and methods for haptic fiddling. The following detailed description first provides an overview of an illustrative device and how it can be used for haptic fiddling. Next, examples of various devices that may be used for haptic fiddling are described. The detailed description then provides an illustrative system that can be used for haptic fiddling. Following the illustrative system, is an illustrative method for haptic fiddling according to various embodiments.

After the illustrative method, the detailed description provides examples of haptic fiddling that can be performed on one or more electronic devices. For example, a description of how dragging a ball on a display of an electronic device can be used for haptic fiddling is described herein. As another example, a description of how an interaction with an image displayed on a display of an electronic device can be used for haptic fiddling is described herein. Yet another example, describes how interacting with an entire device, such as by rolling the device, can be used for haptic fiddling. Numerous other embodiments are disclosed herein and variations are within the scope of this disclosure.

Those of ordinary skill in the art will realize that the following description is illustrative only and is not intended to be in any way limiting. Other embodiments will readily suggest themselves to such skilled persons having the benefit of this disclosure. Reference will now be made in detail to implementations of example embodiments as illustrated in the accompanying drawings. The same reference indicators will be used throughout the drawings and the following description to refer to the same or like items.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another.

Illustrative Device & Embodiment

Figure 1:
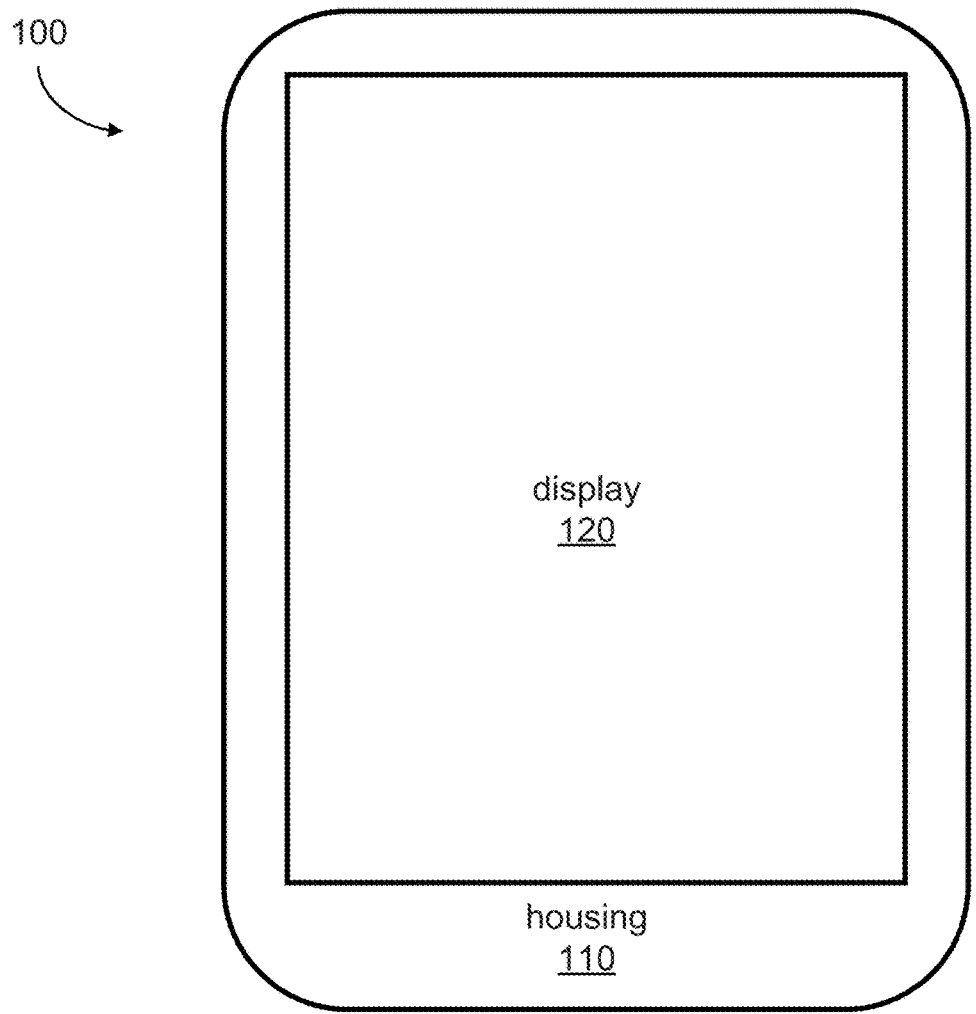
FIG. 1 illustrates an electronic device for haptic fiddling in accordance with an embodiment.

FIG. 1 illustrates an electronic device 100 for haptic fiddling. In some embodiments, a fiddling activity can be an activity that requires minimal attention of a user of the electronic device 100. For example, in one embodiment, a user makes gestures on display 120 of the electronic device 100 when the electronic device 100 is stored in a pocket of the user, similar to a user jingling change in a pocket. In such an embodiment, the user's interaction with the display 120 of the electronic device may require little attention of the user. In other embodiments, a fiddling activity is an activity that is a monotonous repetitive task, such as tapping and/or a non-goal oriented activity—such as flipping, twisting, or spinning the electronic device 100. In yet other embodiments, a fiddling activity can be an activity performed in an aimless or desultory manner to occupy oneself, such as rolling a pencil on your fingers. Numerous other embodiments and fiddling activities are disclosed herein and variations are within the scope of this disclosure.

In some embodiments, electronic device 100 is a portable handheld phone, such as a smartphone. As a user interacts with the smartphone, the smartphone may output effects to alert the user to various interactions. For example, in one embodiment, the smartphone executes an application that allows a user to drag and/or "throw" a ball displayed on a display of smartphone. Thus, the user may touch a location on the display of the smartphone and make a gesture on the display corresponding to a ball being thrown. In some embodiments, if the ball being thrown collides with another object (e.g., another ball displayed on the display) and/or collides with the edge of the display (e.g., the user attempts to the ball move outside the display area), then the smartphone generates and outputs an output signal.

The generated output signal can correspond to one or more modalities and may be sent to one or more output devices. For example, if the ball being thrown collides with another object, then the smartphone may generate a first output signal that corresponds with a vision modality such that, when the first output signal is sent to the display, the display provides an updated view indicating that the ball the user is moving collided with another object. In addition, the first output signal may correspond with a haptic modality such that, when the first output signal is sent to a haptic output device associated with the smartphone, the haptic output device outputs one or more haptic effects indicating that the ball the user is moving collided with another object.

The vision modality and/or the haptic modality may provide a mental model to a user of the smartphone that expresses the interaction(s) between the user and the smartphone. For example, the updated display indicating that the ball the user is moving collided with another object may provide a mental model to the user such that when the user sees the updated display, the user understands that the ball collided with another object. Similarly, the haptic effect(s) output when the ball the user is moving collides with another object may provide a mental model to the user such that when the user feels the outputted haptic effects, the user understands that the ball collided with another object. Thus, various modalities may provide analogous information to the user of the smartphone.

In some embodiments, one or more modalities that corresponded to the first output signal that was generated and output—as described above—is removed, disabled, or otherwise does not correspond to a second output signal that is generated and output after the first output signal. For example, a user may press a power button on the smartphone so that the display no longer displays images. In this embodiment, when the user touches the display with a finger and moves the ball to a new location on the display, the smartphone generates a second output signal if the ball collides with another object, such as another ball.

The second output signal can correspond to one or more modalities but may not correspond to all of the modalities of the first output signal. For example, if the first output signal corresponded to a vision modality and a haptic modality, then the second output signal may correspond to only the haptic modality. In this embodiment, when the ball the user is moving collides with another object, the smartphone may generate a second output signal that corresponds to the haptic modality and may output the generated second output signal to one or more haptic output devices associated with the smartphone. The haptic output device(s) may output one or more haptic effects configured to indicate to a user of the smartphone that the ball the user is moving has collided with another object. Even though the second output signal does not correspond to the vision modality like the first output signal, a user of the smartphone should understand from the haptic modality that does correspond to the second output signal that the ball the user is moving has collided with another object. Thus, in embodiments, the second output signal conveys analogous information to a user of the smartphone as the first output signal even though the first output signal and the second output signal correspond to at least one different modality. Moreover, in embodiments, a first modality corresponding to the first output signal and a second modality corresponding to the second output signal are configured to express a same mental model to a user. Therefore, because the user has previously associated the vision and haptic modalities with the ball colliding with another object, the user is able to later infer the collision of the ball with another object based on the haptic modality and without the vision modality. Numerous other embodiments are disclosed herein and variations are within the scope of this disclosure.

This illustrative example is given to introduce the reader to the general subject matter discussed herein. The invention is not limited to this example. The following sections describe various additional non-limiting embodiments and examples of devices, systems, and methods for parameter modification of haptic effects.

Illustrative Device

Figure 2:
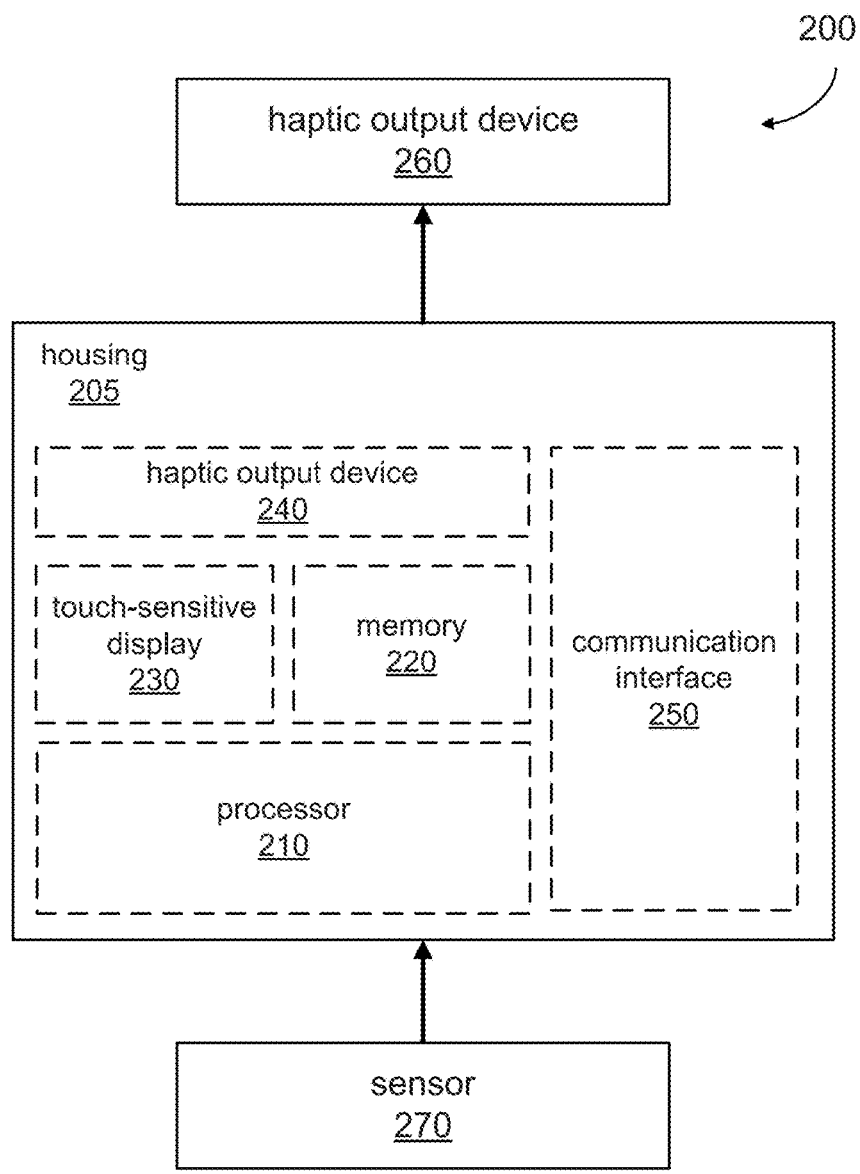
FIG. 2 illustrates an electronic device for haptic fiddling in accordance with an embodiment.

FIG. 2 illustrates an electronic device 200 for haptic fiddling according to one embodiment. In the embodiment shown in FIG. 2, the electronic device 200 comprises a housing 205, a processor 210, a memory 220, a touch-sensitive display 230, a haptic output device 240, a communication interface 250, and a sensor 270. In addition, the electronic device 200 is in communication with haptic output device 260, which may be optionally coupled to or incorporated into some embodiments. The processor 210 is in communication with the memory 220 and, in this embodiment, both the processor 210 and the memory 220 are disposed within the housing 205. The touch-sensitive display 230, which comprises or is in communication with a touch-sensitive surface, is partially disposed within the housing 205 such that at least a portion of the touch-sensitive display 230 is exposed to a user of the electronic device 200. In other embodiments, a tough-sensitive surface is partially disposed within the housing 205 and is separate from the display. In some embodiments, the touch-sensitive display 230 may not be disposed within the housing 205. For example, the electronic device 200 may be connected to or otherwise communicate with a touch-sensitive display 230 disposed within a separate housing. In some embodiments, the housing 205 may comprise two housings that are slidably coupled to each other, pivotably coupled to each other, or releasably coupled to each other. In other embodiments, the housing 205 may comprise any number of housings.

In the embodiment shown in FIG. 2, the touch-sensitive display 230 is in communication with the processor 210 and is configured to provide signals to the processor 210 and/or the memory 220 and to receive signals from the processor 210 and/or memory 220. The memory 220 is configured to store program code or data, or both, for use by the processor 210, which is configured to execute program code stored in memory 220 and to transmit signals to and receive signals from the touch-sensitive display 230. In the embodiment shown in FIG. 2, the processor 210 is in communication with the communication interface 250 and is configured to receive signals from the communication interface 250 and to output signals to the communication interface 250 to communicate with other components or devices such as one or more electronic devices. In addition, the processor 210 is in communication with haptic output device 240 and haptic output device 260 and is further configured to output signals to cause haptic output device 240 or haptic output device 260, or both, to output one or more haptic effects.

Furthermore, the processor 210 is in communication with sensor 270 and is configured to receive signals from sensor 270. For example, processor 210 may receive one or more signals from sensor 270 corresponding with one or more interactions with the electronic device 200. For example, one or more sensor signals may be received by processor 210 from sensor 270 when a user of the electronic device 200 shakes the device 200. As another example, one or more sensor signals can be received by processor 210 from sensor 270 when a user presses a location on the touch-sensitive display 230 and/or when a user makes a gesture on touch-sensitive display 230. In some embodiments, processor 210 can receive sensor information from one or more sensors, such as sensor 270, to derive or otherwise determine one or more interactions. Interactions can include, but are not limited to a contact, a series of contacts, a gesture, a contact pressure above a predetermined threshold, a contact pressure below a predetermined threshold, a contact on a flexible touch-sensitive surface such as a flexible touch-screen display, a bending of a flexible display, a vibration, a shake, any other suitable interaction, or a combination thereof.

In embodiments, processor 210 receives one or more sensor signals from one or more input devices integrated into the electronic device 200, connected to the electronic device 200, and/or in communication with the electronic device 200. For example, the processor 210 may receive one or more sensor signals from a touch-sensitive surface of the touch-sensitive display 230. As another example, the processor 210 may receive one or more sensor signals from an input device such as a keyboard, a mouse, a touchpad, a trackball, a microphone, a touch-sensitive surface, and/or another suitable input device that is integrated into the electronic device 200, connected to the electronic device 200, and/or in communication with the electronic device 200. A sensor signal may comprise information such as one or more contacts, locations, pressures, gestures, key presses, and/or other information indicating how a user is interacting with one or more input devices. Numerous other embodiments are disclosed herein and variations are within the scope of this disclosure.

The processor 210 may then utilize the information it receives from one or more sensors, such as sensor 270, to determine one or more effects to output. For example, the first sensor signal may indicate an interaction with electronic device 200 and the processor 210 may use the information in the sensor signal to determine one or more effects that should be output. For example, the processor 210 may determine that one or more audio effects, one or more visual effects, and/or one or more haptic effects should be output based at least in part on information received from one or more sensor signals. As another example, sensor signal may comprise one or more locations of a contact on the touch-sensitive display 230 and the processor 210 may use the location(s) of the contact to determine one or more effects corresponding to at least one modality that should be output. In some embodiments, the processor 210 determines when one or more objects displayed on display 230 collides with another object displayed on display 230 based at least in part on sensor information received from one or more sensors. In this embodiment, the processor 210 may determine one or more effects corresponding to one or more modalities that should be output when an object displayed on the display 230 collides with another object on the display 230.

Once the processor 210 determines one or more effects that should be output, the processor 210 can generate one or more output signals. For example, in one embodiment, one or more output signals is generated by processor 210 in response to receive a sensor signal. As another example, one or more output signals may be generated when a determination is made that one or more effects corresponding to at least one modality should be output. In embodiments, a generated output signal may correspond to one or more modalities. For example, a generated output signal may correspond to a video effect corresponding to a visual modality, an audio effect corresponding to an auditory modality, and/or a haptic effect corresponding to a tactile modality. In various embodiments, an output signal corresponds with a vision modality, an audition modality, a haptic modality, a proprioception modality, a gustation modality, an olfaction modality, a thermoception modality, a nociception modality, and/or an equilibrioception modality. For example, a modality output device may be disposed within housing 205 of the electronic device 200 and/or be in communication with the electronic device 200. In embodiments, the modality output device corresponds with one or more modalities such as a vision modality, an audition modality, a haptic modality, a proprioception modality, a gustation modality, an olfaction modality, a thermoception modality, a nociception modality, and/or an equilibrioception modality. Thus, in embodiments, display 230 is an example of a modality output device that corresponds with a vision modality. As another example, a modality output device that is configured to output a scent can correspond with an olfaction modality. In this embodiment, an output signal generated by processor 210 may be configured to cause the modality output device corresponding with the olfaction modality to output a scent. In some embodiments, a modality output device is configured to increase and/or decrease a temperature of at least a portion of an electronic device and/or another component or device associated with the modality output device. In such an embodiment, the modality output device corresponds with a thermoception modality. In this embodiment, an output signal generated by processor 210 can be configured to cause the modality output device corresponding with the thermoception modality to increase or decrease a temperature of at least a portion of the electronic device 200. Thus, a user of electronic device 200 can feel a change in temperature based at least in part of the thermoception modality corresponding to the modality output device when the modality output device receives an output signal from processor 210 corresponding to the thermoception modality. Numerous other embodiments are disclosed herein and variations are within the scope of this disclosure.

For example, if an output signal corresponds with a vision modality, then the output signal may be configured to cause a display to refresh or otherwise update graphics on the display. As another example, if an output signal corresponds with an audition modality, then the output signal can be configured to cause a speaker to output one or more sounds. If an output signal corresponds with a haptic modality, then the output signal may be configured to cause one or more haptic output devices to output a haptic effect. Once one or more output signals have been generated, one or more of the output signals can be sent to one or more output devices. For example, a generated output signal may be sent to one or more displays, speakers, haptic output devices, communication devices, and/or one or more other suitable output devices. As another example, processor 210 may generate an output signal configured to cause display 230 to update and haptic output device 240 to output a haptic effect. In this embodiment, the generated output signal may be sent by processor 210 to the display 230 and the haptic output device 240. In one embodiment, processor 210 generates a first output signal configured to cause display 230 to update and a second output signal configured to cause haptic output device 260 to output a haptic effect. In this embodiment, processor 210 outputs the generated first output signal to the display 230 and the generated second output signal to the haptic output device 260. Numerous other embodiments are disclosed herein and variations are within the scope of this disclosure.

The device illustrated in FIG. 2 is merely illustrative, and in various other embodiments, the electronic device 200 may comprise or be in communication with fewer or additional components and/or devices than shown in FIG. 2. For example, other user input devices such as a mouse, a keyboard, a camera and/or other input device(s) may be comprised within the electronic device 200 or be in communication with the electronic device 200. As another example, electronic device 200 may comprise or otherwise be in communication with one, two, three, or more sensors and/or one, two, three, or more haptic output devices. In another example, electronic device 200 may not comprise a communication interface 250 in one embodiment. As yet another example, electronic device 200 may not be in communication with haptic output device 260 in an embodiment. Numerous other embodiments are disclosed herein and variations are within the scope of this disclosure.

Various other components may also be modified. For example, in some embodiments, sensor 270 is partially or fully disposed within housing 205. As another example, sensor 270 may be disposed within the housing 205 of the electronic device 200. In one embodiment, the electronic device 200 is not in communication with haptic output device 260 and does not comprise communication interface 250. In another embodiment, the electronic device 200 does not comprise a touch-sensitive display 230 or a communication interface 250, but comprises a touch-sensitive surface and is in communication with an external display. In other embodiments, the electronic device 200 may not comprise or be in communication with a haptic output device at all. Thus, in various embodiments, the electronic device 200 may comprise or be in communication with any number of components, such as in the various embodiments disclosed herein as well as variations that would be apparent to one of skill in the art.

The electronic device 200 can be any device that is capable of receiving user input. For example, the electronic device 200 in FIG. 2 includes a touch-sensitive display 230 that comprises a touch-sensitive surface. In some embodiments, a touch-sensitive surface may be overlaid on the touch-sensitive display 230. In other embodiments, the electronic device 200 may comprise or be in communication with a display and a separate touch-sensitive surface. In still other embodiments, the electronic device 200 may comprise or be in communication with a display and may comprise or be in communication with other user input devices, such as a mouse, a keyboard, buttons, knobs, slider controls, switches, wheels, rollers, other manipulanda, or a combination thereof.

In some embodiments, one or more touch-sensitive surfaces may be included on or disposed within one or more sides of the electronic device 200. For example, in one embodiment, a touch-sensitive surface is disposed within or comprises a rear surface of the electronic device 200. In another embodiment, a first touch-sensitive surface is disposed within or comprises a rear surface of the electronic device 200 and a second touch-sensitive surface is disposed within or comprises a side surface of the electronic device 200. In some embodiments, the electronic device 200 may comprise two or more housing components, such as in a clamshell arrangement or in a slidable arrangement. For example, one embodiment comprises an electronic device 200 having a clamshell configuration with a touch-sensitive display disposed in each of the portions of the clamshell. Furthermore, in embodiments where the electronic device 200 comprises at least one touch-sensitive surface on one or more sides of the electronic device 200 or in embodiments where the electronic device 200 is in communication with an external touch-sensitive surface, the display 230 may or may not comprise a touch-sensitive surface. In some embodiments, one or more touch-sensitive surfaces may have a flexible touch-sensitive surface. In such embodiments, a user may be able to bend or otherwise deform the flexible touch-sensitive surface as a method of input. For example, in one embodiment, an electronic device has a flexible touch-screen display and a user can deform the flexible touch-screen display by pressing locations on the flexible touch-screen display to input information to the electronic device. As another example, a user may bend a portion of or the entire flexible touch-screen display as a means of input according to some embodiments. In other embodiments, one or more touch-sensitive surfaces may be rigid. In various embodiments, the electronic device 200 may comprise both flexible and rigid touch-sensitive surfaces.

The housing 205 of the electronic device 200 shown in FIG. 2 provides protection for at least some of the components electronic device 200. For example, the housing 205 may be a plastic casing that protects the processor 210 and memory 220 from foreign articles such as rain. In some embodiments, the housing 205 protects the components in the housing 205 from damage if the electronic device 200 is dropped by a user. The housing 205 can be made of any suitable material including but not limited to plastics, rubbers, or metals. Various embodiments may comprise different types of housings or a plurality of housings. For example, in some embodiments, electronic device 200 may be a portable device, handheld device, toy, gaming console, handheld video game system, gamepad, game controller, desktop computer, portable multifunction device such as a cell phone, smartphone, personal digital assistant (PDA), eReader, portable reading device, handheld reading device, laptop, tablet computer, digital music player, remote control, medical instrument, etc. In embodiments, the electronic device 200 may be embedded in another device such as a vehicle, wrist watch, other jewelry, arm band, gloves, glasses, etc. Thus, in embodiments, the electronic device 200 is wearable. In an embodiment, the electronic device 200 is embedded in another device such as, for example, the console of a car or a steering wheel. Numerous other embodiments are disclosed herein and variations are within the scope of this disclosure.

In the embodiment shown in FIG. 2, the touch-sensitive display 230 provides a mechanism for a user to interact with the electronic device 200. For example, the touch-sensitive display 230 detects the location or pressure, or both, of a user's finger in response to a user hovering over, touching, or pressing the touch-sensitive display 230 (all of which may be referred to as a contact in this disclosure). In one embodiment, a contact can occur through the use of a camera. For example, a camera may be used to track a viewer's eye movements as the reader views the content displayed on the display 230 of the electronic device 200. In this embodiment, haptic effects may be triggered based at least in part on the viewer's eye movements. For example, a haptic effect may be output when a determination is made that the viewer is viewing content at a particular location of the display 230. In some embodiments, the touch-sensitive display 230 may comprise, be connected with, or otherwise be in communication with one or more sensors that determine the location, pressure, a size of a contact patch, or any of these, of one or more contacts on the touch-sensitive display 230.

For example, in one embodiment, the touch-sensitive display 230 comprises or is in communication with a mutual capacitance system. In another embodiment, the touch-sensitive display 230 comprises or is in communication with an absolute capacitance system. In some embodiments, the touch-sensitive display 230 may comprise or be in communication with a resistive panel, a capacitive panel, infrared LEDs, photodetectors, image sensors, optical cameras, or a combination thereof. Thus, the touch-sensitive display 230 may incorporate any suitable technology to determine a contact on a touch-sensitive surface such as, for example, resistive, capacitive, infrared, optical, thermal, dispersive signal, or acoustic pulse technologies, or a combination thereof. In embodiments, a determined haptic effect is modified or otherwise configured based at least in part on interactions and/or other information received from one or more sensors that can be used to determine one or more interactions. For example, an intensity parameter of a haptic effect may be increased or decreased based on one or more interactions. In some embodiments, the display is not touch-sensitive. In other embodiments, the electronic device 200 does not have a display.

In the embodiment shown in FIG. 2, haptic output devices 240 and 260 are in communication with the processor 210 and are configured to provide one or more haptic effects. For example, in one embodiment, when an actuation signal is provided to haptic output device 240, haptic output device 260, or both, by the processor 210, the respective haptic output device(s) 240, 260 outputs a haptic effect based on the actuation signal. For example, in the embodiment shown, the processor 210 is configured to transmit a haptic output signal to haptic output device 240 comprising an analog drive signal. In some embodiments, the processor 210 is configured to transmit a command to haptic output device 260, wherein the command includes parameters to be used to generate an appropriate drive signal to cause the haptic output device 260 to output the haptic effect. In other embodiments, different signals and different signal types may be sent to each of one or more haptic output devices. For example, in some embodiments, a processor may transmit low-level drive signals to drive a haptic output device to output a haptic effect. Such a drive signal may be amplified by an amplifier or may be converted from a digital to an analog signal, or from an analog to a digital signal using suitable processors or circuitry to accommodate the particular haptic output device being driven.

A haptic output device, such as haptic output devices 240 or 260, can be any component or collection of components that is capable of outputting one or more haptic effects. For example, a haptic output device can be one of various types including, but not limited to, an eccentric rotational mass (ERM) actuator, a linear resonant actuator (LRA), a piezo-electric actuator, a voice coil actuator, an electro-active polymer (EAP) actuator, a memory shape alloy, a pager, a DC motor, an AC motor, a moving magnet actuator, an E-core actuator, a smartgel, an electrostatic actuator, an electrotactile actuator, a deformable surface, an electrostatic friction (ESF) device, an ultrasonic friction (USF) device, or any other haptic output device or collection of components that perform the functions of a haptic output device or that are capable of outputting a haptic effect. Multiple haptic output devices or different-sized haptic output devices may be used to provide a range of vibrational frequencies, which may be actuated individually or simultaneously. Various embodiments may include a single or multiple haptic output devices and may have the same type or a combination of different types of haptic output devices. In some embodiments, one or more haptic output devices are directly or indirectly in communication with electronic device, such as via wired or wireless communication. In one embodiment, the electronic device can be placed in a vehicle or is integrated into a vehicle and one or more haptic output devices are embedded into the vehicle. For example, one or more haptic output devices may be embedded in a seat, steering wheel, pedal, etc. of the vehicle. In some embodiments, instead of having haptic output device 240 and/or haptic output device 260 or in addition to having haptic output device 240 and/or haptic output device 260, the electronic device 200 has one or more other output devices. For example, the electronic device 200 may have a speaker and/or a display. In one embodiment, the electronic device 200 has one or more haptic output devices, one or more speakers, and one or more displays. Numerous other embodiments are disclosed herein and variations are within the scope of this disclosure.

In various embodiments, one or more haptic effects may be produced in any number of ways or in a combination of ways. For example, in one embodiment, one or more vibrations may be used to produce a haptic effect, such as by rotating an eccentric mass or by linearly oscillating a mass. In some such embodiments, the haptic effect may be configured to impart a vibration to the entire electronic device or to only one surface or a limited part of the electronic device. In another embodiment, friction between two or more components or friction between at least one component and at least one contact may be used to produce a haptic effect, such as by applying a brake to a moving component, such as to provide resistance to movement of a component or to provide a torque. In order to generate vibration effects, many devices utilize some type of actuator and/or other haptic output device. Known haptic output devices used for this purpose include an electromagnetic actuator such as an Eccentric Rotating Mass ("ERM") in which an eccentric mass is moved by a motor, a Linear Resonant Actuator ("LRA") in which a mass attached to a spring is driven back and forth, or a "smart material" such as piezoelectric, electro-active polymers or shape memory alloys.

In other embodiments, deformation of one or more components can be used to produce a haptic effect. For example, one or more haptic effects may be output to change the shape of a surface or a coefficient of friction of a surface. In an embodiment, one or more haptic effects are produced by creating electrostatic forces and/or ultrasonic forces that are used to change friction on a surface. In other embodiments, an array of transparent deforming elements may be used to produce a haptic effect, such as one or more areas comprising a smartgel. Haptic output devices also broadly include non-mechanical or non-vibratory devices such as those that use electrostatic friction (ESF), ultrasonic surface friction (USF), or those that induce acoustic radiation pressure with an ultrasonic haptic transducer, or those that use a haptic substrate and a flexible or deformable surface, or those that provide projected haptic output such as a puff of air using an air jet, and so on. In some embodiments, a haptic effect is a kinesthetic effect. U.S. patent application Ser. No. 13/092,484 describes ways that one or more haptic effects can be produced and describes various haptic output devices. The entirety of U.S. patent application Ser. No. 13/092,484, filed Apr. 22, 2011, is hereby incorporated by reference.

In FIG. 2, the communication interface 250 is in communication with the processor 210 and provides wired or wireless communications, from the electronic device 200 to other components or other devices. For example, the communication interface 250 may provide wireless communications between the electronic device 200 and a wireless sensor or a wireless actuation device. In some embodiments, the communication interface 250 may provide communications to one or more other devices, such as another electronic device 200, to allow users to interact with each other at their respective devices. The communication interface 250 can be any component or collection of components that enables the multi-pressure touch-sensitive input electronic device 200 to communicate with another component or device. For example, the communication interface 250 may comprise a PCI network adapter, a USB network adapter, or an Ethernet adapter. The communication interface 250 may communicate using wireless Ethernet, including 802.11a, g, b, or n standards. In one embodiment, the communication interface 250 can communicate using Radio Frequency (RF), Bluetooth, CDMA, TDMA, FDMA, GSM, WiFi, satellite, or other cellular or wireless technology. In other embodiments, the communication interface 250 may communicate through a wired connection and may be in communication with one or more networks, such as Ethernet, token ring, USB, FireWire 1394, fiber optic, etc. In some embodiments, electronic device 200 comprises a single communication interface 250. In other embodiments, electronic device 200 comprises two, three, four, or more communication interfaces. Thus, in embodiments, electronic device 200 can communicate with one or more components and/or devices through one or more communication interfaces. In other embodiments, an electronic device 200 may not comprise a communication interface 250.

In FIG. 2, the sensor 270 is in communication with the processor 210 and provides sensor information to the processor 210. For example, sensor 270 may provide one or more interactions to the processor 210. The sensor 270 may provide an input signal indicating one or more interactions. As another example, sensor 270 can provide information corresponding to one or more interactions with electronic device 200 to processor 210. In embodiments, the information the sensor 270 provides to processor 210 corresponds to an interaction with the entire electronic device 200, such as a user shaking the electronic device 200. In other embodiments, the information sensor 270 provides to processor 210 corresponds to an interaction with a part of the electronic device 200, such as a touch-sensitive display 230 or another suitable input device.

The embodiment shown in FIG. 2 depicts a single sensor 270. In some embodiments, multiple sensors can be used. Additionally, a sensor may be housed in the same component as the other components of the electronic device 200 or in a separate component. For example, in some embodiments, the processor 210, memory 220, and sensor 270 are all comprised in an electronic device 200, such as a portable music player, a portable telephone, and/or a wearable device. In some embodiments, a sensor is placed in component separate from another component that houses the memory and/or processor. For instance, a wearable sensor may be in communication with the processor and memory or an electronic device via a wired or wireless connection.

Sensor 270 may comprise any number and/or type of sensing components. For example, sensor 270 can comprise an accelerometer and/or gyroscope. A non-limiting list of examples of sensors and interactions is provided below:

TABLE 1

Exemplary Sensors and Conditions

| Sensor | Interaction Sensed |
| --- | --- |
| Accelerometer | Force in one, two, or three directions |
| Altimeter | Altitude |
| Thermometer | Ambient temperature; user body temperature |
| Heart rate monitor | Heart rate of device user |
| Skin resistance monitor | Skin resistance of device user |
| Oxygen sensor | Oxygen use of device user |
| Audio sensor/microphone | Ambient audio and/or audio generated by device user |
| Photosensor | Ambient light |
| IR/Photosensor | User eye movement, position, body temperature |
| Hygrometer | Relative humidity |
| Speedometer | Velocity |
| Pedometer/odometer | Distance traveled |
| Chronometer | Time of day, date |
| Weight | Mass or quantity of matter |
| Camera | Heart beat or pulse of a user |

Illustrative System

Figure 3:
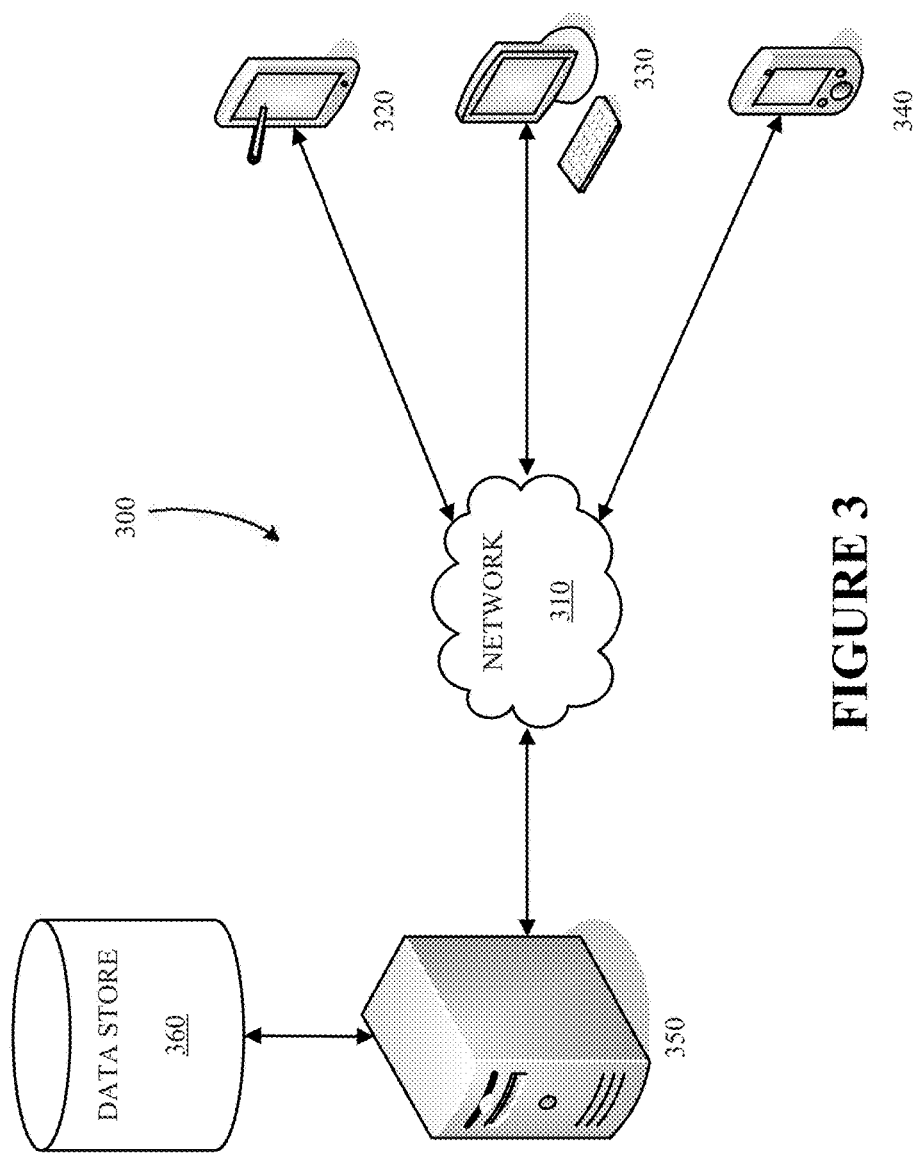
FIG. 3 illustrates a system diagram depicting computing devices for haptic fiddling in a computing environment in accordance with an embodiment.

FIG. 3 illustrates a system diagram depicting illustrative computing devices for haptic fiddling in an illustrative computing environment according to an embodiment. The system 300 shown in FIG. 3 includes three electronic devices, 320-340, and a web server 350. Each of the electronic devices, 320-340, and the web server 350 are connected to a network 310. In this embodiment, each of the electronic devices, 320-340, is in communication with the web server 350 through the network 310. Thus, each of the electronic devices, 320-340, can send requests to the web server 350 and receive responses from the web server 350 through the network 310.

In an embodiment, the network 310 shown in FIG. 3 facilitates communications between the electronic devices, 320-340, and the web server 350. The network 310 may be any suitable number or type of networks or links, including, but not limited to, a dial-in network, a local area network (LAN), wide area network (WAN), public switched telephone network (PSTN), a cellular network, a WiFi network, the Internet, an intranet or any combination of hard-wired and/or wireless communication links. In one embodiment, the network 310 is a single network. In other embodiments, the network 310 may comprise two or more networks. For example, the electronic devices 320-340 may be connected to a first network and the web server 350 may be connected to a second network and the first and the second network may be connected by a third network. Numerous other network configurations would be obvious to a person of ordinary skill in the art.

An electronic device may be capable of communicating with a network, such as network 310, and capable of sending and receiving information to and from another device, such as web server 350. For example, in FIG. 3, one electronic device 320 is a tablet computer. The tablet computer 320 includes a touch-sensitive display and is able to communicate with the network 310 by using a wireless communication interface card. Another device that may be an electronic device 330 shown in FIG. 3 is a desktop computer. The desktop computer 330 is in communication with a display and is able to connect to the network 330 through a wired network connection. The desktop computer 330 may be in communication with any number of input devices such as a keyboard or a mouse. In FIG. 3, a mobile phone is an electronic device 340. The mobile phone 340 may be able to communicate with the network 310 over a wireless communications means using Bluetooth, CDMA, TDMA, FDMA, GSM, WiFi, or other cellular or wireless technology.

A device receiving a request from another device may be any device capable of communicating with a network, such as network 310, and capable of sending and receiving information to and from another device. For example, in the embodiment shown in FIG. 3, the web server 350 may receive a request from another device (e.g., one or more of electronic devices 320-340) and may be in communication with network 310. A receiving device may be in communication with one or more additional devices, such as additional servers. For example, web server 350 in FIG. 3 may be in communication with another server. In an embodiment, a web server may communicate with one or more additional devices to process a request received from an electronic device. For example, web server 350 in FIG. 3 may be in communication with a plurality of additional servers, at least one of which may be used to process at least a portion of a request from any of the electronic devices 320-340. In one embodiment, web server 350 may be part of or in communication with a content distribution network (CDN).

One or more devices may be in communication with a data store. In FIG. 3, web server 350 is in communication with data store 360. In embodiments, data store 360 is operable to receive instructions from web server 350 and/or other devices in communication with data store 360 and obtain, update, or otherwise process data in response to receiving the instructions. In one embodiment, an electronic device, such as tablet computer 320, comprises and/or is in communication with a data store. A data store, such as data store 360, may contain electronic content, such as an eBook or magazine, data items, user accounts, metadata, information associated with predefined haptic effects, information associated with predefined events, associations between predefined haptic effects and predefined events, user interactions, user history, information regarding occurrences of events, default parameters for one or more haptic effects, haptic profiles for one or more operating environments, one or more tactile models, minimum and/or maximum parameters for a haptic effect, information regarding generated predefined haptic effects, interactions, parameters, parameter adjustments, correlations between interactions and parameter adjustments, correlations between parameter adjustments and profiles and/or operating modes, correlations between tactile models and interactions, correlations between tactile models and haptic effects, correlations between tactile models and parameters, correlations between profiles and/or operating modes and interactions, other information usable to modify parameters of a haptic effect, information usable to determine an interaction, other information, or a combination thereof.

Data store 360 shown in FIG. 3 can receive requests from web server 350 and send responses to web server 350. For example, web server 350 may receive a request from tablet computer 320 for a predefined haptic effect and a default intensity parameter. In response to receiving the request from the tablet computer 320, web server 350 may query data store 360 for the predefined haptic effect and the default intensity parameter for the predefined haptic effect. In response to receiving the request from the web server 350, data store 360 may send the web server 350 the predefined haptic effect and the default intensity parameter. The web server 350, can send the predefined haptic effect and the default intensity parameter to the tablet computer 320. The tablet computer 320 may modify the default intensity parameter for the predefined haptic effect based at least in part on one or more interactions. For example, if one or more interactions indicate that a greater or otherwise more intense haptic effect should be output, then the tablet computer 320 may increase the intensity parameter above the default intensity parameter. Similarly, if one or more interactions indicate that a lesser or otherwise less intense haptic effect should be generated, then the table computer 320 may decrease the intensity parameter below the default intensity parameter. Numerous other embodiments are disclosed herein and variations are within the scope of this disclosure.

Illustrative Method of Parameter Modification of Haptic Effects

Figure 4:
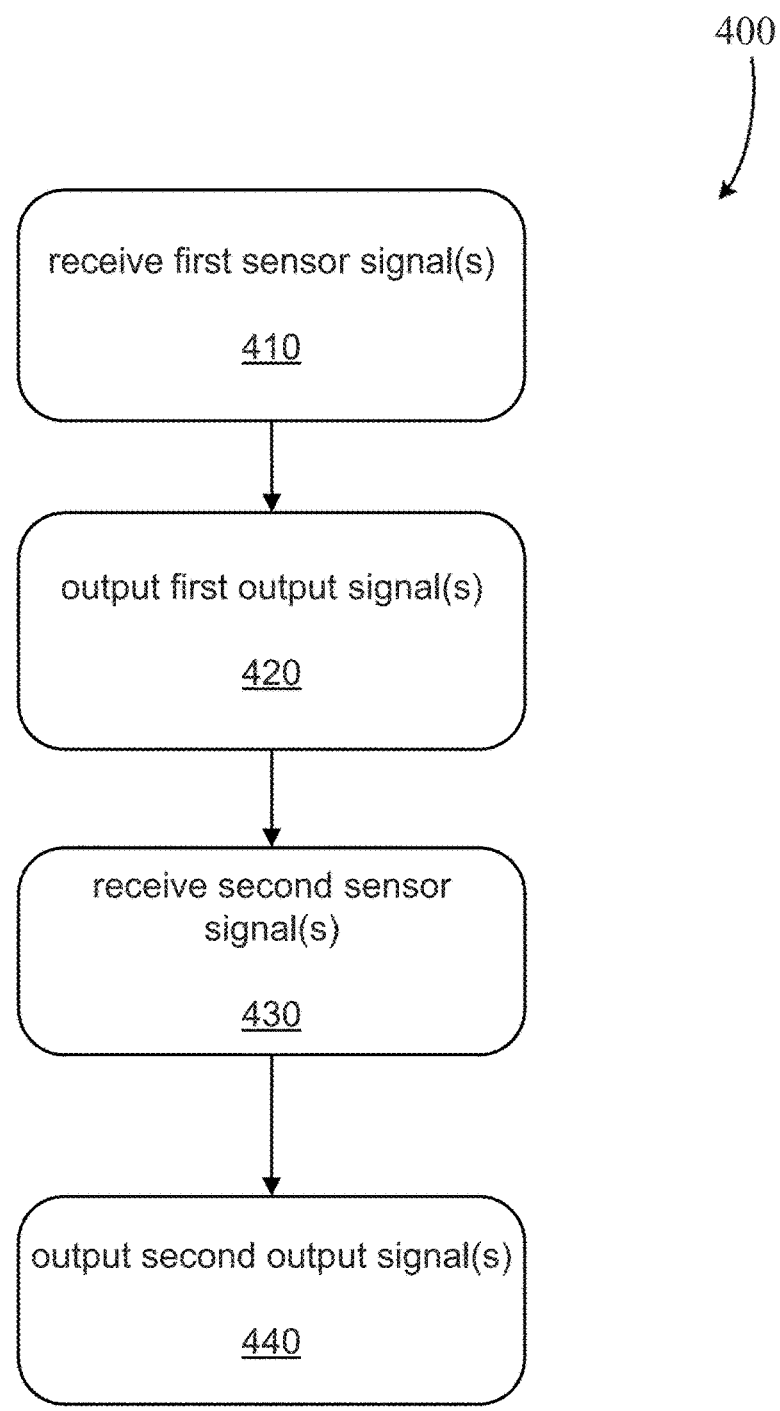
FIG. 4 illustrates a flow chart directed to a method of haptic fiddling in accordance with an embodiment.

FIG. 4 illustrates a flow chart directed to a method 400 of haptic fiddling in accordance with an embodiment. The method 400 shown in FIG. 4 will be described with respect to electronic device 200 shown in FIG. 2. In embodiments, method 400 can be performed by one or more of the devices shown in system 300 in FIG. 3.

The method 400 begins in block 410 when a first sensor signal is received. For example, referring to FIG. 2, one or more first sensor signals may be received from sensor 270. As another example, referring to FIG. 3, in embodiments tablet computer 320 receives one or more first sensor signals from one or more sensors in communication with the tablet computer either directly or through a network such as network 310.

One or more first sensor signals may be received from any number of components or devices. In one embodiment, a first sensor signal is received from a sensor completely disposed within a housing of an electronic device. For example, referring to FIG. 2, a first sensor signal may be received from sensor 270 where sensor 270 is disposed within housing 205 of the electronic device 200. In another embodiment, a first sensor signal is received from a sensor at least partially disposed within a housing of an electronic device. For example, a first sensor signal may be received from touch-sensitive display 230 where touch-sensitive display 230 is partially disposed within housing 205 such that a user can interact with the electronic device 200 by contacting one or more locations on the touch-sensitive display 230. In other embodiments, a first sensor signal may be received from sensor 270 where sensor 270 is in communication with electronic device 200. For example, sensor 270 may be worn on a user's extremity, such as the user's arm or leg, and sensor 270 may send one or more first sensor signals to processor 210 via wired and/or wireless communications. As another example, sensor 270 may be part of another device and one or more first sensor signals may be sent from sensor 270 to the electronic device 200 through communication interface 250. Numerous other embodiments are disclosed herein and variations are within the scope of this disclosure.

One or more first sensor signals may be received by an electronic device and/or processor at any number of times. For example, one or more first sensor signals may be received by electronic device 200 from a sensor when an interaction with the sensor occurs. Thus, in one embodiment, touch-sensitive display 230 sends a first sensor signal to processor 210 when a user contacts a location on the touch-sensitive display 230. As another example, one or more first sensor signals may be continuously or periodically sent by one or more sensors. Thus, in one embodiment, sensor 270 provides a measurement to processor 210 via one or more first sensor signals at a periodic interval. The periodic interval may be any suitable interval such as every hundred milliseconds, every second, every five seconds, every minute, every five minutes, every hour, or any other interval. In another embodiment, one or more first sensor signals may be sent and/or received in response to a request. For example, processor 210 may send a request to sensor 270 for a sensor signal indicating a current state and/or a measurement corresponding to sensor 270. In this embodiment, in response to receiving the request from processor 210, sensor 270 may send a current state and/or a measurement to processor 210. Numerous other embodiments are disclosed herein and variations are within the scope of this disclosure.

In embodiments, one or more sensor signals are received as a user interacts with an entire electronic device and/or a portion of an electronic device. For example, one or more first sensor signals may be received by processor 210 as a user rolls, flips, tosses, or otherwise manipulates the entire electronic device 200, such as by moving the entire electronic device through space (e.g., free space gestures). Thus, in one embodiment, moving the entire electronic device in a particular motion such as to the left, to the right, in a circle, etc. through the air may cause one or more sensor signals to be received by the electronic device that indicate one or more free space gestures. As another example, one or more first sensor signals may be received by processor 210 as a user interacts with sensor 270 where sensor 270 is external to the housing 205 and in communication with processor 210. In one embodiment, processor 210 receives one or more first sensor signals from touch-sensitive display 230 as a user interacts with the display. In some embodiments, electronic device 200 comprises a keypad and one or more first sensor signals are received by processor 210 from the keypad as a user interacts with the keypad. Numerous other embodiments are disclosed herein and variations are within the scope of this disclosure.

One or more interactions can be received from one or more sensors. In an embodiment, an interaction is received by an electronic device from a sensor in the electronic device. In another embodiment, an interaction is received by an electronic device from a sensor in communication with the electronic device. For example, a remote sensor may wirelessly send one or more interactions to an electronic device. In one embodiment, an interaction is received by an electronic device from a sensor of another electronic device and/or a sensor in communication with another electronic device. For example, referring to FIG. 3, mobile phone 340 may receive an interaction from a sensor integrated into or otherwise in communication with the tablet computer 320. In yet other embodiments, an electronic device receives information from one or more sensors that can be used to determine one more interactions. In some embodiments, one or more interactions are based at least in part on user input. For example, in one embodiment, a user selects an operating mode. As another example, a user may enter one or more user traits such as a height, weight, ethnicity, gender, etc. Numerous other embodiments are disclosed herein and variations are within the scope of this disclosure.

An interaction and/or information usable to determine an interaction can include ambient conditions, applied forces in one or more directions, altitudes, ambient temperatures, body temperature of a user, heart rate, skin resistance, oxygen use, ambient audio, ambient light, user movements, user position, humidity, velocity, distance, dates, times, weight, height, age, other interactions disclosed herein, other interactions, or a combination thereof. In embodiments, one or more interactions are determined from one or more sensors including, but not limited to, accelerometers, altimeters, thermometers, heart rate monitors, resistance monitors, oxygen sensors, audio sensors, microphones, cameras, photosensors, infrared sensors, hygrometers, speedometers, pedometers, odometers, chronometers, timers, weight sensors, etc. In one embodiment, information received from one or more sensors can be used as proxy for one or more other sensors and/or interactions. For example, in an embodiment, an electronic device may receive sensor information specifying a speed of a car, plane, etc. In this embodiment, the electronic device may use the speed of the car as a proxy for a level of noise and/or a vibration level of the car. As discussed below, one or more determined haptic effects may be modified based at least in part on the received or otherwise determined interaction(s) and/or a proxy for one or more interactions. Numerous other embodiments are disclosed herein and variations are within the scope of this disclosure.

In embodiments, one or more first sensor signals can correspond with any number of operating environments. For example, in one embodiment, an electronic device executes a standalone application, such as a game. In this embodiment, as the user interacts with the electronic device to play the game, one or more sensors send one or more first sensor signals to processor 210. For example, when a user of the electronic device 200 interacts with the electronic device 200 to cause an object displayed on display 230 to collide with another object, then one or more sensors may send one or more first sensor signals to processor 210. In this embodiment, the one or more first sensor signals can indicate that a collision between the two objects has occurred. In other embodiments, a fiddling application may correspond to a standalone application or a plugin. In one embodiment, a fiddling application is integrated into an operating system. In some embodiments, a fiddling application may be displayed and/or executed at any number of times including, but not limited to, when the electronic device is busy, when the electronic device is waiting to receive information from another device and/or a user, when a progress bar and/or other progress indication is active, and/or when the electronic device is in a "lock" mode. In at least some of these embodiments, one or more first sensor signals may be received by processor 210 from one or more sensors, such as sensor 270, when the fiddling application is being executed and/or display. Numerous other embodiments are disclosed herein and variations are within the scope of this disclosure.

One or more first sensor signals can provide any number of indications. For example, a first sensor signal can indicate an interaction with the entire electronic device. Thus, in embodiments, one or more first sensor signals correspond with a shake, toss, and/or squeeze of an electronic device. As another example, one or more first sensor signals may correspond with the electronic device 200 colliding with another object such as the ground. In some embodiments, one or more first sensor signals correspond with a key press, contact, touch, or other input of one or more input devices of an electronic device or in communication with the electronic device. As discussed further herein, one or more first sensor signals may indicate and/or provide information usable to determine one or more effects, such as a visual effect, an audio effect, and/or a haptic effect. Numerous other embodiments are disclosed herein and variations are within the scope of this disclosure.

Referring back to method 400, once one or more first sensor signals are received 410, then method 400 proceeds to block 420. In block 420, one or more first output signals are output. For example, referring to FIG. 2, one or more first output signals may be output to haptic device 240 and/or haptic device 260. As another example, referring to FIG. 3, one or more first output signals may be sent from web server 350 to tablet computer 320, and tablet computer 320 may output the one or more first output signals to one or more output devices associated with the tablet computer 320.

In various embodiments, processor 210 outputs one or more first output signals to any number of devices. For example, processor 210 may output one or more first output signals to one more other devices through network 310 using communication interface 250. In one embodiment, processor 210 may output one or more first output signals to touch-sensitive display 130, communication interface 250, and haptic output device 260. As another example, processor 210 may output one or more first output signals to touch-sensitive display 230, haptic output device 240, and a speaker of electronic device 200. In embodiments, processor 210 may output a single first output signal to one or more components and/or devices. For example, in one embodiment, processor 210 outputs a first output signal to both touch-sensitive display 230 and haptic output device 240. In another embodiment, processor 210 outputs one first output signal to display 230, haptic output device 240, and haptic output device 260. In still another embodiment, processor 210 outputs one first output signal to both haptic output device 240 and haptic output device 260 and outputs another first output signal to touch-sensitive display 230. This, in embodiments, one first output signal may be output to one or more components of electronic device 200 and/or one or more components and/or devices associated with electronic device 200. In some embodiments, two or more first output signals are output to one or more components of electronic device 200 and/or one or more components and/or devices associated with electronic device 200. For example, one first output signal may be output to touch-sensitive display 230 and another first output signal may also be output to touch-sensitive display 230. As another example, one first output signal may be output to touch-sensitive display 230, another first output signal may be output to haptic output device 240, and another first output signal may be output to a speaker of electronic device 200. Numerous other embodiments are disclosed herein and variations are within the scope of this disclosure.

As discussed above, the processor 210 may output one or more first output signals to the communication interface 250. For example, the processor 210 may output a first output signal to the communication interface 250 instructing the communication interface 250 to send data to another component or device in communication with the device 200. In such an embodiment, the communication interface 250 may send the first output signal to the other device and the other device may perform a function such as updating a display associated with the other device and/or the other device may output a haptic effect. Thus, in embodiments of the present invention, a second device may output one or more haptic effects based at least in part upon an interaction with a first device in communication with the second device.

In other embodiments, a second device may perform any number of functions such as, for example, updating a display associated with the second device or outputting a sound to a speaker associated with the second device based at least in part on an interaction with an electronic device 200.

One or more first output signals may be output at any number of times. In one embodiment, one or more first output signals are output in response to receiving one or more sensor signals indicating an interaction with an electronic device. For example, referring to FIG. 2, sensor 270 may be located inside the housing 205 and sensor 270 may provide one or more sensor signals indicating that the electronic device 200 is being rolled. In this embodiment, one or more first output signals may be output by processor 210 when processor 210 determines that the electronic device 200 is being rolled based at least in part on one or more sensor signals from sensor 270. As another example, sensor 270 may send one or more sensor signals to processor 210 indicating that the electronic device is being sequenced. In this embodiment, one or more first output signals may be output by processor 210 when processor 210 receives an indication that the electronic device is being squeezed. In other embodiments, one or more first output signals may be output when an electronic device is being rocked back and forth, one or more contacts exceeds a threshold pressure, one or more contacts corresponding to one or more locations on a touch-sensitive surface, one or more gestures occur, one or more collisions with two or more virtual objects occur, one or more collisions between two or more objects in an augmented reality occur, and/or one or more collisions with a real object occurs. In some embodiments, one or more first output signals may be output after an interaction has occurred. For example, referring to FIG. 2, a first output signal may be output if a contact on touch-sensitive display 230 remains above a predetermined threshold for a predetermined period of time. Numerous other embodiments are disclosed herein and variations are within the scope of this disclosure.

One or more first output signals may correspond to any number of modalities. For example, a first output signal may correspond to a video effect corresponding to a visual modality, an audio effect corresponding to an auditory modality, and/or a haptic effect corresponding to a haptic modality. In various embodiments, a single first output signal corresponds with a vision modality, an audition modality, a haptic modality, a proprioception modality, a gustation modality, an olfaction modality, a thermoception modality, a nociception modality, and/or an equilibrioception modality. In other embodiments, one first output signal corresponds with one or more modalities and another first output signal corresponds with one or more modalities. In one embodiment, both first output signals correspond with the same modality or modalities. For example, both first output signals may correspond with a haptic modality. As another example, both first output signals may correspond with a visual modality and an auditory modality. In embodiments, one first output signal corresponds with one or more different modalities than another first output signal. For example, one first output signal may correspond with a visual modality and another first output signal may correspond with a haptic modality. As another example, one first output signal may correspond with a vision modality, an auditory modality and a haptic modality and another first output signal may correspond with a vision modality and a thermoception modality. Numerous other embodiments are disclosed herein and variations are within the scope of this disclosure.

In embodiments, a first output signal that corresponds with one or more particular modalities is configured to cause one or more components and/or devices to output an effect corresponding to the one or more particular modalities. For example, if a first output signal corresponds with a vision modality, then the first output signal may be configured to cause a display to refresh or otherwise update graphics on the display. As another example, if a first output signal corresponds with an audition modality, then the first output signal can be configured to cause a speaker to output one or more sounds. If a first output signal corresponds with a haptic modality, then the first output signal may be configured to cause one or more haptic output devices to output a haptic effect.

One or more of the output signals can be sent to any number of components and/or output devices. For example, a first output signal may be sent to one or more displays, speakers, haptic output devices, communication devices, and/or one or more other suitable output devices. As another example, referring to FIG. 2, processor 210 may output a first output signal configured to cause display 230 to update and haptic output device 240 to output a haptic effect. In this embodiment, the first output signal may be sent by processor 210 to the display 230 and the haptic output device 240. In one embodiment, processor 210 outputs a first output signal configured to cause display 230 to update and another first output signal configured to cause haptic output device 260 to output a haptic effect. In this embodiment, processor 210 outputs one first output signal to the display 230 and another first output signal to the haptic output device 260. Numerous other embodiments are disclosed herein and variations are within the scope of this disclosure.

In embodiments, one or more processors may determine one or more effects that should be output based at least in part on information received from one or more sensors. For example, referring to FIG. 2, one or more first sensor signals may indicate an interaction with electronic device 200 and the processor 210 may use the information in the sensor signal to determine one or more effects that should be output. Thus, in an embodiment, processor 210 determines that one or more audio effects, one or more visual effects, and/or one or more haptic effects should be output based at least in part on information received from one or more sensor signals. As another example, sensor signal may comprise one or more locations of a contact on the touch-sensitive display 230 and processor 210 may use the location(s) and/or pressure(s) of the contact(s) to determine one or more effects corresponding to at least one modality that should be output. In some embodiments, processor 210 determines when one or more objects displayed on display 230 collides with another object displayed on display 230 based at least in part on sensor information received from one or more sensors. In this embodiment, processor 210 may determine one or more effects corresponding to one or more modalities that should be output when an object displayed on the display 230 collides with another object on the display 230.

In embodiments, processor 210 receives a signal from the touch-sensitive display 230 when a user contacts the touch-sensitive display 230 and the signal includes information associated with an input on, or a status of, the touch-sensitive display 230 such as the x, y location or pressure, or both, of a contact on the touch-sensitive display 230. In this embodiment, if the user is viewing electronic content associated with a list of emails on the touch-sensitive display 230 of the electronic device 200 and if the processor 210 determines that the user is making a gesture in a direction towards the bottom of the display, then the processor 210 determines that the touch-sensitive display 230 should be updated to scroll down the list of emails. In this embodiment, a haptic effect may have previously been determined for an email message of high importance. In one embodiment, a signal is generated when information associated with an email message having a high importance is displayed on the display 230.

In embodiments, processor 210 generates one or more first output signals at any number of times. In one embodiment, one or more processors generate one or more first output signals when information from one or more sensors indicate that an interaction has occurred with an entire electronic device and/or a portion of an electronic device. For example, processor 210 may generate one or more first output signals when information from sensor 270 indicates that the electronic device 200 is being rolled. As another example, processor 210 may generate one or more first output signals when information from sensor 270 indicates that a particular gesture has occurred on touch-screen display 230. In embodiments, one or more first output signals are generated the first time an interaction occurs. In another embodiment, one or more first output signals are generated each time an interaction occurs. In some embodiments, one or more first output signals are generated before occurs and/or before an interaction is completed. For example, processor 210 may determine that an interaction occurs when a contact at a particular location on the touch-sensitive display 230 is above a predetermined threshold pressure. In this embodiment, processor 210 may generate one or more first output signals when a contact is at the particular location but before the pressure of the contact is above the predetermined threshold pressure. Numerous other embodiments are disclosed herein and variations are within the scope of this disclosure.

In embodiments, one or more processors may generate any number of first output signals. For example, in one embodiment, processor 210 generates one first output signal configured to cause a first haptic effect and another first output signal configured to cause a second haptic effect. In some embodiments, processor 210 generates different first output signals for each interaction that occurs. In various embodiments, processor 210 generates one or more first output signals configured to cause the touch-sensitive display 230, the communication interface 250, the haptic output device 240, the haptic output device 260, the speaker 270, other components of the device 200, other components of devices in communication with the device 200, or a combination thereof to output one or more effects corresponding to one or more modalities. For example, in one embodiment, processor 210 generates a first output signal when an interaction occurs where the first output signal is configured to cause a haptic output device in another device to output a haptic effect. In one embodiment, processor 210 sends the first output signal to the other device through the communication interface 250. Numerous other embodiments are disclosed herein and variations are within the scope of this disclosure.

Referring back to method 400, once one or more output signals have been output, the method 400 proceeds to block 430. In block 430, one or more second sensor signals are received. For example, referring to FIG. 2, one or more second sensor signals may be received from sensor 270. As another example, referring to FIG. 3, in embodiments tablet computer 320 receives one or more second sensor signals from one or more sensors in communication with the tablet computer either directly or through a network such as network 310.

One or more second sensor signals may be received from any number of components or devices. In one embodiment, a second sensor signal is received from a sensor completely disposed within a housing of an electronic device. For example, referring to FIG. 2, a second sensor signal may be received from sensor 270 where sensor 270 is disposed within housing 205 of the electronic device 200. In another embodiment, a second sensor signal is received from a sensor at least partially disposed within a housing of an electronic device. For example, a second sensor signal may be received from touch-sensitive display 230 where touch-sensitive display 230 is partially disposed within housing 205 such that a user can interact with the electronic device 200 by contacting one or more locations on the touch-sensitive display 230. In other embodiments, a second sensor signal may be received from sensor 270 where sensor 270 is in communication with electronic device 200. For example, sensor 270 may be worn on a user's extremity, such as the user's arm or leg, and sensor 270 may send one or more second sensor signals to processor 210 via wired and/or wireless communications. As another example, sensor 270 may be part of another device and one or more second sensor signals may be sent from sensor 270 to the electronic device 200 through communication interface 250. Numerous other embodiments are disclosed herein and variations are within the scope of this disclosure.

One or more second sensor signals may be received by an electronic device and/or processor at any number of times. For example, one or more second sensor signals may be received by electronic device 200 from a sensor when an interaction with the sensor occurs. Thus, in one embodiment, touch-sensitive display 230 sends a second sensor signal to processor 210 when a user contacts a location on the touch-sensitive display 230. As another example, one or more second sensor signals may be continuously or periodically sent by one or more sensors. Thus, in one embodiment, sensor 270 provides a measurement to processor 210 via one or more second sensor signals at a periodic interval. The periodic interval may be any suitable interval such as every hundred milliseconds, every second, every five seconds, every minute, every five minutes, every hour, or any other interval. In another embodiment, one or more second sensor signals may be sent and/or received in response to a request. For example, processor 210 may send a request to sensor 270 for a sensor signal indicating a current state and/or a measurement corresponding to sensor 270. In this embodiment, in response to receiving the request from processor 210, sensor 270 may send a current state and/or a measurement to processor 210. Numerous other embodiments are disclosed herein and variations are within the scope of this disclosure.

In embodiments, one or more sensor signals are received as a user interacts with an entire electronic device and/or a portion of an electronic device. For example, one or more second sensor signals may be received by processor 210 as a user rolls, flips, tosses, or otherwise manipulates the entire electronic device 200. As another example, one or more second sensor signals may be received by processor 210 as a user interacts with sensor 270 where sensor 270 is external to the housing 205 and in communication with processor 210. In one embodiment, processor 210 receives one or more second sensor signals from touch-sensitive display 230 as a user interacts with the display. In some embodiments, electronic device 200 comprises a keypad and one or more second sensor signals are received by processor 210 from the keypad as a user interacts with the keypad. Numerous other embodiments are disclosed herein and variations are within the scope of this disclosure.

One or more interactions can be received from one or more sensors. In an embodiment, an interaction is received by an electronic device from a sensor in the electronic device. In another embodiment, an interaction is received by an electronic device from a sensor in communication with the electronic device. For example, a remote sensor may wirelessly send one or more interactions to an electronic device. In one embodiment, an interaction is received by an electronic device from a sensor of another electronic device and/or a sensor in communication with another electronic device. For example, referring to FIG. 3, mobile phone 340 may receive an interaction from a sensor integrated into or otherwise in communication with the tablet computer 320. In yet other embodiments, an electronic device receives information from one or more sensors that can be used to determine one more interactions. In some embodiments, one or more interactions are based at least in part on user input. For example, in one embodiment, a user selects an operating mode. As another example, a user may enter one or more user traits such as a height, weight, ethnicity, gender, etc. Numerous other embodiments are disclosed herein and variations are within the scope of this disclosure.

An interaction and/or information usable to determine an interaction can include ambient conditions, applied forces in one or more directions, altitudes, ambient temperatures, body temperature of a user, heart rate, skin resistance, oxygen use, ambient audio, ambient light, user movements, user position, humidity, velocity, distance, dates, times, weight, height, age, other interactions disclosed herein, other interactions, or a combination thereof. In embodiments, one or more interactions are determined from one or more sensors including, but not limited to, accelerometers, altimeters, thermometers, heart rate monitors, resistance monitors, oxygen sensors, audio sensors, microphones, cameras, photosensors, infrared sensors, hygrometers, speedometers, pedometers, odometers, chronometers, timers, weight sensors, etc. In one embodiment, information received from one or more sensors can be used as proxy for one or more other sensors and/or interactions. For example, in an embodiment, an electronic device may receive sensor information specifying a speed of a car, plane, etc. In this embodiment, the electronic device may use the speed of the car as a proxy for a level of noise and/or a vibration level of the car. As discussed below, one or more determined haptic effects may be modified based at least in part on the received or otherwise determined interaction(s) and/or a proxy for one or more interactions. Numerous other embodiments are disclosed herein and variations are within the scope of this disclosure.

In some embodiments, one or more modalities are deactivated, removed, and/or otherwise disabled before one or more second sensor signals are received. For example, after a first output signal corresponding with a vision modality has been output and before a second sensor signal is received, display 230 may be turned off such that a user can no longer view information on the display. Numerous other embodiments are disclosed herein and variations are within the scope of this disclosure.

In embodiment, one or more second sensor signals are received from the same device(s) and/or component(s) that one or more first sensor signals were received from. For example, referring to FIG. 2, if a first sensor signal is received from display 230, then a second sensor signal may be received from display 230. In some embodiments, one or more second sensor signals are received from one or more different device(s) and/or component(s) than one or more first sensor signals were received from. For example, if a first sensor signal is received from display 230, then a second sensor signal may be received from sensor 270. Numerous other embodiments are disclosed herein and variations are within the scope of this disclosure.

In embodiments, one or more second sensor signals are configured to convey analogous information as one or more first sensor signals. For example, a first sensor signal received from display 230 may correspond with two objects colliding and indicate that a collision between the two objects has occurred. In this embodiment, a second sensor signal received from display 230 may correspond with two objects colliding and indicate that a collision between the two objects has occurred. Thus, in this embodiment, both the first sensor signal and the second sensor signal are configured to provide an indication that a collision between two objects has occurred. As another example, a first sensor signal received from display 230 may correspond with two objects colliding and indicate that a collision between the two objects has occurred. In this embodiment, a second sensor signal received from sensor 270 may correspond with two objects colliding and indicate that a collision between the two objects has occurred. Thus, in this embodiment, both the first sensor signal and the second sensor signal are configured to provide an indication that a collision between two objects has occurred. Numerous other embodiments are disclosed herein and variations are within the scope of this disclosure.

In embodiments, one or more second sensor signals can correspond with any number of operating environments. For example, in one embodiment, an electronic device executes a standalone application, such as a game. In this embodiment, as the user interacts with the electronic device to play the game, one or more sensors send one or more second sensor signals to processor 210. For example, when a user of the electronic device 200 interacts with the electronic device 200 to cause an object displayed on display 230 to collide with another object, then one or more sensors may send one or more second sensor signals to processor 210. In this embodiment, the one or more second sensor signals can indicate that a collision between the two objects has occurred. In other embodiments, a fiddling application may correspond to a standalone application or a plugin. In one embodiment, a fiddling application is integrated into an operating system. In some embodiments, a fiddling application may be displayed and/or executed at any number of times including, but not limited to, when the electronic device is busy, when the electronic device is waiting to receive information from another device and/or a user, when a progress bar and/or other progress indication is active, and/or when the electronic device is in a "lock" mode. In at least some of these embodiments, one or more second sensor signals may be received by processor 210 from one or more sensors, such as sensor 270, when the fiddling application is being executed and/or display. Numerous other embodiments are disclosed herein and variations are within the scope of this disclosure.

One or more second sensor signals can provide any number of indications. For example, a second sensor signal can indicate an interaction with the entire electronic device. Thus, in embodiments, one or more second sensor signals correspond with a shake, toss, and/or squeeze of an electronic device. As another example, one or more second sensor signals may correspond with the electronic device 200 colliding with another object such as the ground. In some embodiments, one or more second sensor signals correspond with a key press, contact, touch, or other input of one or more input devices of an electronic device or in communication with the electronic device. As discussed further herein, one or more second sensor signals may indicate and/or provide information usable to determine one or more effects, such as a visual effect, an audio effect, and/or a haptic effect. Numerous other embodiments are disclosed herein Referring back to method 400, one or more second sensor signals have been received, the method 400 proceeds to block 440. In block 440, one or more second output signals are output. For example, referring to FIG. 2, one or more second output signals may be output to haptic device 240 and/or haptic device 260. As another example, referring to FIG. 3, one or more second output signals may be sent from web server 350 to tablet computer 320, and tablet computer 320 may output the one or more second output signals to one or more output devices associated with the tablet computer 320.

In various embodiments, processor 210 outputs one or more second output signals to any number of devices. For example, processor 210 may output one or more second output signals to one more other devices through network 310 using communication interface 250. In one embodiment, processor 210. In one embodiment, processor 210 may output one or more second output signals to touch-sensitive display 130, communication interface 250, and haptic output device 260. As another example, processor 210 may output one or more second output signals to touch-sensitive display 230, haptic output device 240, and a speaker of electronic device 200. In embodiments, processor 210 may output a single second output signal to one or more components and/or devices. For example, in one embodiment, processor 210 outputs a second output signal to both touch-sensitive display 230 and haptic output device 240. In another embodiment, processor 210 outputs one second output signal to display 230, haptic output device 240, and haptic output device 260. In still another embodiment, processor 210 outputs one second output signal to both haptic output device 240 and haptic output device 260 and outputs another second output signal to touch-sensitive display 230. This, in embodiments, one second output signal may be output to one or more components of electronic device 200 and/or one or more components and/or devices associated with electronic device 200. In some embodiments, two or more second output signals are output to one or more components of electronic device 200 and/or one or more components and/or devices associated with electronic device 200. For example, one second output signal may be output to touch-sensitive display 230 and another second output signal may also be output to touch-sensitive display 230. As another example, one second output signal may be output to touch-sensitive display 230, another second output signal may be output to haptic output device 240, and another second output signal may be output to a speaker of electronic device 200. Numerous other embodiments are disclosed herein and variations are within the scope of this disclosure.

As discussed above, the processor 210 may output one or more second output signals to the communication interface 250. For example, the processor 210 may output a second output signal to the communication interface 250 instructing the communication interface 250 to send data to another component or device in communication with the device 200. In such an embodiment, the communication interface 250 may send the second output signal to the other device and the other device may perform a function such as updating a display associated with the other device and/or the other device may output a haptic effect. Thus, in embodiments of the present invention, a second device may output one or more haptic effects based at least in part upon an interaction with a first device in communication with the second device. In other embodiments, a second device may perform any number of functions such as, for example, updating a display associated with the second device or outputting a sound to a speaker associated with the second device based at least in part on an interaction with an electronic device 200.

One or more second output signals may be output at any number of times. In one embodiment, one or more second output signals are output in response to receiving one or more sensor signals indicating an interaction with an electronic device. For example, referring to FIG. 2, sensor 270 may be located inside the housing 205 and sensor 270 may provide one or more sensor signals indicating that the electronic device 200 is being rolled. In this embodiment, one or more second output signals may be output by processor 210 when processor 210 determines that the electronic device 200 is being rolled based at least in part on one or more sensor signals from sensor 270. As another example, sensor 270 may send one or more sensor signals to processor 210 indicating that the electronic device is being sequenced. In this embodiment, one or more second output signals may be output by processor 210 when processor 210 receives an indication that the electronic device is being squeezed. In other embodiments, one or more second output signals may be output when an electronic device is being rocked back and forth, one or more contacts exceeds a threshold pressure, one or more contacts corresponding to one or more locations on a touch-sensitive surface, one or more gestures occur, one or more collisions with two or more virtual objects occur, one or more collisions between two or more objects in an augmented reality occur, and/or one or more collisions with a real object occurs. In some embodiments, one or more second output signals may be output after an interaction has occurred. For example, referring to FIG. 2, a second output signal may be output if a contact on touch-sensitive display 230 remains above a predetermined threshold for a predetermined period of time. Numerous other embodiments are disclosed herein and variations are within the scope of this disclosure.

One or more second output signals may correspond to any number of modalities. For example, a second output signal may correspond to a video effect corresponding to a visual modality, an audio effect corresponding to an auditory modality, and/or a haptic effect corresponding to a haptic modality. In various embodiments, a single second output signal corresponds with a vision modality, an audition modality, a haptic modality, a proprioception modality, a gustation modality, an olfaction modality, a thermoception modality, a nociception modality, and/or an equilibrioception modality. In other embodiments, one second output signal corresponds with one or more modalities and another second output signal corresponds with one or more modalities. In one embodiment, both second output signals correspond with the same modality or modalities. For example, both second output signals may correspond with a haptic modality. As another example, both second output signals may correspond with a visual modality and an auditory modality. In embodiments, one second output signal corresponds with one or more different modalities than another second output signal. For example, one second output signal may correspond with a visual modality and another second output signal may correspond with a haptic modality. As another example, one second output signal may correspond with a vision modality, an auditory modality and a haptic modality and another second output signal may correspond with a vision modality and a thermoception modality. Numerous other embodiments are disclosed herein and variations are within the scope of this disclosure.

In embodiments, one or more second output signals correspond to one or more different modalities than one or more first output signals corresponded to. For example, a first output signal may correspond with a vision modality and a haptic modality and a second output signal may correspond with only a haptic modality. As another example, a first output signal may correspond with a vision modality and a second output signal may correspond with a haptic modality. In embodiments, one or more second output signals may correspond to at least one modality that also corresponded to one or more first output signals. For example, both a first output signal and a second output signal may correspond to a haptic modality. Numerous other embodiments are disclosed herein and variations are within the scope of this disclosure.

In some embodiments, one or more modalities are deactivated, removed, and/or otherwise disabled before one or more second output signals are output. For example, a first output signal may correspond with a vision modality and a haptic modality. In this embodiment, before a second output signal is output display 230 may be turned off such that a user can no longer view information on the display. In this embodiment, the second output signal may correspond with a haptic modality. As another example, the second output signal may correspond with a haptic modality and an audition modality. In some embodiments, the second output signal may not correspond with a vision modality because the display is no longer turned on. In other embodiments, the second output signal may correspond with a vision modality. Numerous other embodiments are disclosed herein and variations are within the scope of this disclosure.

In embodiments, one or more second output signals are configured to convey analogous information to a user as one or more first output signals. For example, a first output signal may correspond to a vision modality and be configured to cause a display to update one or more images displayed on the display to indicate that a collision between two objects has occurred. In this embodiment, a second output signal may correspond to a haptic modality and be configured to cause a haptic output device to output one or more haptic effects to indicate that a collision between two objects has occurred. Thus, in this embodiment, both the first output signal and the second output signal are configured to provide an indication that a collision between two objects has occurred. As another example, a first output signal may correspond to a vision modality and a haptic modality and be configured to cause a display to update one or more images displayed on the display to indicate that an electronic device is being squeezed and be configured to cause a haptic output device to output one or more haptic effects configured to indicate that the electronic device is being squeezed. In this embodiment, a second output signal may correspond to only a haptic modality and only be configured cause a haptic output device to output one or more haptic effects configured to indicate that the electronic device is being squeezed. Thus, in this embodiment, both the first output signal and the second output signal are configured to indicate that the electronic device is being squeezed. Numerous other embodiments are disclosed herein and variations are within the scope of this disclosure.

In one embodiment, one or more second output signals are output to the same device(s) and/or component(s) that one or more first output signals were output to. For example, referring to FIG. 2, if a first output signal is output to haptic output device 240, then a second output signal may be output to haptic output device 240. In some embodiments, one or more second output signals are output to one or more different device(s) and/or component(s) than one or more first output signals were output to. For example, if a first output signal is output to display 230 and haptic output device 240, then a second output signal may be output to only haptic output device 240. As another example, if a first output signal is output to display 230 and a speaker of the electronic device 200, then a second output signal may be output to haptic output device 240. Numerous other embodiments are disclosed herein and variations are within the scope of this disclosure.

In embodiments, a second output signal that corresponds with one or more particular modalities is configured to cause one or more components and/or devices to output an effect corresponding to the one or more particular modalities. For example, if a second output signal corresponds with a vision modality, then the second output signal may be configured to cause a display to refresh or otherwise update graphics on the display. As another example, if a second output signal corresponds with an audition modality, then the second output signal can be configured to cause a speaker to output one or more sounds. If a second output signal corresponds with a haptic modality, then the second output signal may be configured to cause one or more haptic output devices to output a haptic effect.

One or more of the output signals can be sent to any number of components and/or output devices. For example, a second output signal may be sent to one or more displays, speakers, haptic output devices, communication devices, and/or one or more other suitable output devices. As another example, referring to FIG. 2, processor 210 may output a second output signal configured to cause display 230 to update and haptic output device 240 to output a haptic effect. In this embodiment, the second output signal may be sent by processor 210 to the display 230 and the haptic output device 240. In one embodiment, processor 210 outputs a second output signal configured to cause display 230 to update and another second output signal configured to cause haptic output device 260 to output a haptic effect. In this embodiment, processor 210 outputs one second output signal to the display 230 and another second output signal to the haptic output device 260. Numerous other embodiments are disclosed herein and variations are within the scope of this disclosure.

In embodiments, one or more processors may determine one or more effects that should be output based at least in part on information received from one or more sensors. For example, referring to FIG. 2, one or more first sensor signals may indicate an interaction with electronic device 200 and the processor 210 may use the information in the sensor signal to determine one or more effects that should be output. Thus, in an embodiment, processor 210 determines that one or more audio effects, one or more visual effects, and/or one or more haptic effects should be output based at least in part on information received from one or more sensor signals. As another example, sensor signal may comprise one or more locations of a contact on the touch-sensitive display 230 and processor 210 may use the location(s) and/or pressure(s) of the contact(s) to determine one or more effects corresponding to at least one modality that should be output. In some embodiments, processor 210 determines when one or more objects displayed on display 230 collides with another object displayed on display 230 based at least in part on sensor information received from one or more sensors. In this embodiment, processor 210 may determine one or more effects corresponding to one or more modalities that should be output when an object displayed on the display 230 collides with another object on the display 230.

In embodiments, processor 210 receives a signal from the touch-sensitive display 230 when a user contacts the touch-sensitive display 230 and the signal includes information associated with an input on, or a status of, the touch-sensitive display 230 such as the x, y location or pressure, or both, of a contact on the touch-sensitive display 230. In this embodiment, if the user is viewing electronic content associated with a list of emails on the touch-sensitive display 230 of the electronic device 200 and if the processor 210 determines that the user is making a gesture in a direction towards the bottom of the display, then the processor 210 determines that the touch-sensitive display 230 should be updated to scroll down the list of emails. In this embodiment, a haptic effect may have previously been determined for an email message of high importance. In one embodiment, a signal is generated when information associated with an email message having a high importance is displayed on the display 230.

In embodiments, processor 210 generates one or more second output signals at any number of times. In one embodiment, one or more processors generate one or more second output signals when information from one or more sensors indicate that an interaction has occurred with an entire electronic device and/or a portion of an electronic device. For example, processor 210 may generate one or more second output signals when information from sensor 270 indicates that the electronic device 200 is being rolled. As another example, processor 210 may generate one or more second output signals when information from sensor 270 indicates that a particular gesture has occurred on touch-screen display 230. In embodiments, one or more second output signals are generated the first time an interaction occurs. In another embodiment, one or more second output signals are generated each time an interaction occurs. In some embodiments, one or more second output signals are generated before occurs and/or before an interaction is completed. For example, processor 210 may determine that an interaction occurs when a contact at a particular location on the touch-sensitive display 230 is above a predetermined threshold pressure. In this embodiment, processor 210 may generate one or more second output signals when a contact is at the particular location but before the pressure of the contact is above the predetermined threshold pressure. Numerous other embodiments are disclosed herein and variations are within the scope of this disclosure.

In embodiments, one or more processors may generate any number of second output signals. For example, in one embodiment, processor 210 generates one second output signal configured to cause a first haptic effect and another second output signal configured to cause a second haptic effect. In some embodiments, processor 210 generates different second output signals for each interaction that occurs. In various embodiments, processor 210 generates one or more second output signals configured to cause the touch-sensitive display 230, the communication interface 250, the haptic output device 240, the haptic output device 260, the speaker 270, other components of the device 200, other components of devices in communication with the device 200, or a combination thereof to output one or more effects corresponding to one or more modalities. For example, in one embodiment, processor 210 generates a second output signal when an interaction occurs where the second output signal is configured to cause a haptic output device in another device to output a haptic effect. In one embodiment, processor 210 sends the second output signal to the other device through the communication interface 250. Numerous other embodiments are disclosed herein and variations are within the scope of this disclosure.

It will be recognized that any type of input synthesis method may be used to generate an interaction parameter for one or more haptic effect signals including, but not limited to, the method of synthesis examples listed in TABLE 2 below. A drive signal may be applied to a haptic actuator according to the interaction parameter. Numerous other embodiments are disclosed herein and variations are within the scope of this disclosure.

Table 2—Methods of Synthesis

Additive synthesis—combining inputs, typically of varying amplitudes

Subtractive synthesis—filtering of complex signals or multiple signal inputs

Frequency modulation synthesis—modulating a carrier wave signal with one or more operators Sampling—using recorded inputs as input sources subject to modification Composite synthesis—using artificial and sampled inputs to establish a resultant "new" input Phase distortion—altering the speed of waveforms stored in wavetables during playback Waveshaping—intentional distortion of a signal to produce a modified result Resynthesis—modification of digitally sampled inputs before playback Granular synthesis—combining of several small input segments into a new input Linear predictive coding—similar technique as used for speech synthesis Direct digital synthesis—computer modification of generated waveforms Wave sequencing—linear combinations of several small segments to create a new input Vector synthesis—technique for fading between any number of different input sources Physical modeling—mathematical equations of the physical characteristics of virtual motion Illustrative Embodiments The following illustrative embodiments depict aspects of fiddling activities according to various embodiments. In some embodiments, including some of the embodiments disclosed herein, fiddling activities require minimal attention of a user. For example, fiddling activities can include activities such as dragging one or more objects, or flipping, tilting, or otherwise maneuvering an electronic device. In embodiments, a fiddling activity involves maneuvering an entire electronic device. In other embodiments, a fiddling activity involves interacting with a portion of an electronic device, but not the entire electronic device. For example, a fiddling activity can involve a user pressing a touch-sensitive surface on part of the electronic device.

In various embodiments, a user of an electronic may create a mental model of a fiddling activity based at least in part of a previous interaction with an electronic device. For example, a user may create a mental model of a fiddling activity when the user views changes displayed on a display of an electronic device and feels various haptic effects output by the electronic device. The mental model created by the user may enable the user to interact with the electronic device at a later time when the outputs by the electronic correspond to different and/or fewer modalities. For example, the output signals output by an electronic device for a particular fiddling activity may initially correspond to a vision modality and a haptic modality because the output signals output by the electronic device are configured to cause a display of the electronic device to update graphical images displayed on the display and the output signals are configured to cause a haptic output device of the electronic device to output one or more haptic effects. Thus, a user may create a mental model of the fiddling activity based on the updated graphical images displayed on the display and the outputted haptic effects.

In some embodiments, a user of the electronic device can use the mental model created from previous interactions with the electronic device and the fiddling activity to interact with the electronic device at a later time. For example, a user may be able to fiddle with the electronic device in the same or a similar manner as before and understand various interactions that take place based on the modality or modalities of one or more output signals. Thus, if the user interacts with the electronic device in a same or a similar manner as before, the electronic device can generate and/or output one or more output signals corresponding to a haptic modality and not corresponding to a vision modality; however, the user may be able to understand the interactions because of the mental model created by the user during previous interactions with the electronic device. For example, the user may be able to understand interactions that occur as the user fiddles with electronic device based on the haptic outputs output by one or more haptic output devices of the electronic device even though the display of the electronic device has been turned off. Numerous other embodiments are disclosed herein and variations are within the scope of this disclosure.

In embodiments, a fiddling activity may be performed visually by a user of an electronic device. In other embodiments, a fiddling activity may be performed non-visually by a user. For example, the user may not look at a display of the electronic device even though the display is active. As another example, the display of an electronic device may be turned off so that a user will not see various interactions with the electronic device even if the user is looking at the electronic device. In one embodiment, a fiddling activity is a monotonous and/or a repetitive task. In other embodiments, a fiddling activity can be an activity that a user wants to improve at over time. Numerous other embodiments are disclosed herein and variations are within the scope of this disclosure.

A fiddling activity can occur at any number of times and/or in any number of applications. In one embodiment, a fiddling activity occurs when an electronic device is busy. For example, an operating system and/or an application being executed on an electronic device may display a popup when the electronic device is busy that enables a user to perform a fiddling activity. In another embodiment, a fiddling activity occurs when an electronic device is waiting for something to occur. For example, an electronic device may enable a user to perform a fiddling activity while the electronic device is downloading information—such as a web page, an image, a document, a collection of documents, a song, another file or collection of files, and/or other information. In an embodiment, an electronic device allows a fiddling activity to be performed when a progress bar is displayed (or would be displayed if the display was active) on a display of the electronic device. As another example, an electronic device may allow a fiddling activity to be performed while a screen lock is activated. In one embodiment, an electronic device enables a fiddling activity to be performed on a wallpaper and/or a screensaver when the wallpaper and/or the screensaver is being displayed (or would be displayed if the display was on). In various embodiments, a fiddling-enabled activity is integrated into an operating system of an electronic device, a plugin for another application such as a web browser, and/or a stand-alone application. Numerous other embodiments are disclosed herein and variations are within the scope of this disclosure.

Dragging a Ball Illustrative Embodiment

Figure 5A:
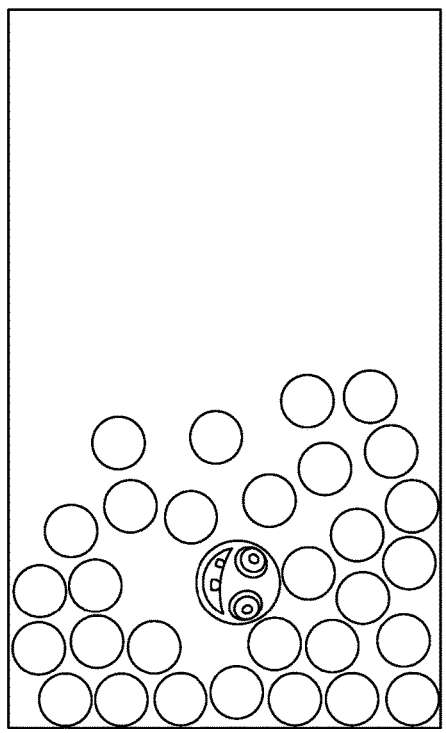
FIG. 5A illustrates aspects of haptic fiddling in accordance with an embodiment.

In one embodiment, an electronic device displays one or more objects on a display of the electronic device. In this embodiment, a user of the electronic device can interact with at least one of the objects by contacting locations on a touch-sensitive surface corresponding to the object(s). For example, as shown in FIG. 5A, an electronic device 200 can display various balls on a display 230 of the electronic device 200. In this example, a user can interact with the larger ball by contacting a location on the touch-sensitive display 230 corresponding to the larger ball and moving the ball to new locations. As the user interacts with the larger ball and moves the ball to various locations, the electronic device 200 can send output signals to various output devices. For example, when the larger ball being moved collides with another ball displayed on the display 230, the electronic device 200 may output a signal that is configured to cause a display to output a graphical representation indicating that the larger ball collided with another ball. In addition, the signal output by the electronic device may be configured to cause a haptic output device to output a haptic effect that indicates that the larger ball collided with another ball. Thus, in one embodiment of the example shown in FIG. 5A, one or more output signals generated and/or output by the electronic device 200 correspond with a vision modality and a haptic modality. Moreover, a user may create a mental model of moving the larger ball and experiencing various outputs when the larger ball collides with another ball.

In one embodiment, after the electronic device has output one or more output signals that correspond with a vision modality and a haptic modality, the display 230 of the electronic device 200 is turned off such that graphics are no longer displayed on the display 230 of the electronic device. In this embodiment, the user of the electronic device 200 may be able to continue interacting with the electronic device. For example, a user may contact a location on the touch-sensitive display 230 corresponding to the location where the larger ball would be displayed if the display 230 was turned on. Moreover, the user may be able to move the larger ball and the electronic device 200 may generate output signals as the user interacts with the larger ball. For example, the electronic device 200 may generate and/or output one or more output signals when the larger ball collides with another ball that would be displayed on the display 230 of the electronic device if the display was turned on. In this embodiment, the one or more output signals may correspond to one or more modalities but does not include all of the modalities of the output signals generated and/or outputted before the display was turned off.

For example, in one embodiment and as discussed above, an output signal output when the larger ball collided with another ball before the display 230 was turned off corresponded with a vision modality and a haptic modality. After the display 230 is turned off, however, an output signal output when the larger ball collides with another ball may correspond with only a haptic modality. Thus, in this embodiment, an output signal output after the display 230 is turned off no longer corresponds with a vision modality. As another example, after the display 230 is turned off, an output signal output when the larger ball collides with another ball may correspond with a haptic modality and an audition modality, but does not correspond with a vision modality. As yet another example, after the display 230 is turned off, an output signal output when the larger ball collides with another ball may correspond with an audition modality, but does not correspond with a vision modality and a haptic modality. Numerous other embodiments are disclosed herein and variations are within the scope of this disclosure.

In some embodiments, a user can recognize the interactions that occur while the user is fiddling with the electronic device based at least in part on the modalities corresponding to various output signals. For example, if an output signal corresponds with a vision modality and a haptic modality when the larger ball collides with another ball before the display 230 is turned off, a user of the electronic device 200 may understand that the larger ball has collided with another ball once the display 230 of the electronic device 200 has been turned off based at least in part on the modalities of the output signals. Thus, if an output signal after the display 230 has been turned off corresponds with a haptic modality but not a vision modality, a user of the electronic device 200 may be able to understand that the larger ball has collided with another ball because of the vision modality and/or the haptic modality of the output signal output before the display 230 was turned off because the haptic modality of the output signal after the display 230 has been turned off conveys analogous information to the user of the electronic device 200 as the vision modality and/or the haptic modality of the output signal output before the display 230 was turned off.

As another example, if an output signal after the display 230 has been turned off corresponds with an audition modality, but not a vision modality or a haptic modality, a user of the electronic device 200 can understand that the larger ball has collided with another ball because the audition modality conveys analogous information to the user of the electronic device as the vision modality and/or the haptic modality of the output signal output before the display 230 was turned off. Thus, one or more modalities corresponding to a first output signal may convey analogous information as one or more modalities corresponding to a second output signal. Numerous other embodiments are disclosed herein and variations are within the scope of this disclosure.

In embodiments, any number of parameters may be implemented. For example, a parameter may increase or decrease the size the ball(s) that a user can move. As another example, a parameter may increase or decrease the size of the ball(s) that can collide with a ball that the user can move. In one embodiment, a parameter may increase a number of balls that a user can move and/or a number of balls that another ball can collide with. In other embodiments, one or more parameters may affect the gravity, density, stiffness, damping, of one or more objects. In an embodiment, one or more parameters can affect haptic effects and/or other outputs. For example, a parameter may correspond to a velocity threshold for outputting a haptic effect. Numerous other embodiments are disclosed herein and variations are within the scope of this disclosure.

Rolling Balls Illustrative Embodiment

Figure 5B:
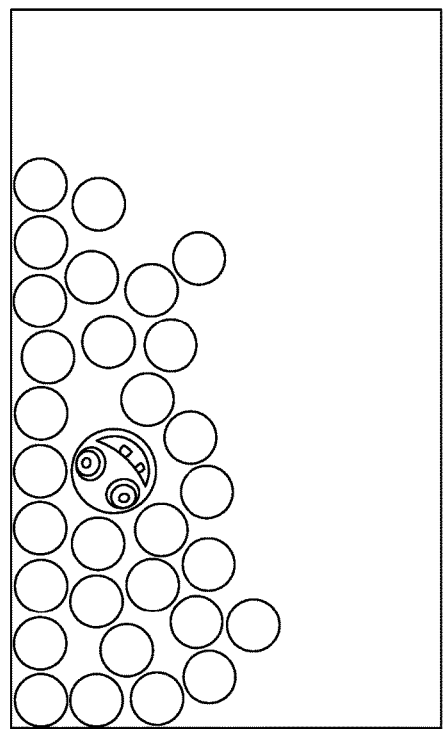
FIG. 5B illustrates aspects of haptic fiddling in accordance with an embodiment.

In one embodiment, an electronic device displays one or more objects of a display of the electronic device. In this embodiment, a user of the electronic device can interact with at least one of the objects by tilting, rotating, turning, or otherwise maneuvering the entire electronic device. For example, as shown in FIG. 5B, an electronic device 200 can display various balls on display 230 of the electronic device 200. In this example, a user can interact the balls by tilting the electronic device 200 from side to side. In response to tilting the electronic device, the balls move to various locations based at least in part on the tilting. Thus, if the user tilts the electronic device to the right, the balls may move to the right on the display. Moreover, if the larger ball collides with one or more of the smaller balls, the display may be updated to indicate that a collision has occurred. In some embodiments, the electronic device 200 may also output a haptic effect to indicate that a collision has occurred. Thus, in embodiments, one or more output signals output by electronic device 200 can correspond with a vision modality and/or a haptic modality. A user using the electronic device may create a mental model of the directions the balls move and/or the visual and/or haptic effect(s) output when a collision between the larger ball and one or more smaller balls occur.

In one embodiment, after the electronic device has output one or more first output signals that correspond with a vision modality and a haptic modality, the display 230 of the electronic device is deactivated such that graphics on display 230 are no longer visible to a user of the electronic device 200. In this embodiment, the user of the electronic device 200 can continue to interact with the electronic device. For example, a user may tilt the electronic device 200. The electronic device 200 may output one or more second output signals as the user interacts with the device. For example, if the larger ball collides with another ball that would be displayed on the display 230 of the electronic device 200 if the display 230 was not deactivated, the electronic device 200 may output a second output configured to cause the haptic output device to output a haptic effect indicating that the larger ball has collided with another ball. Thus, in this embodiment, the second output signal may correspond with only a haptic modality whereas the first output signal corresponds with a haptic modality and a vision modality. Moreover, first output signal and the second output signal may convey analogous information to the user (e.g., that a collision has occurred) even though the second output signal corresponds with less modalities than the first output signal and the user can no longer see the balls moving on the display as the user interacts with the electronic device 200 because the display 230 has been deactivated. Numerous other embodiments are disclosed herein and variations are within the scope of this disclosure.

Prayer Beads Illustrative Embodiment

The embodiment shown in FIGS. 6A and 6B illustrate a prayer bead example of haptic fiddling according to an embodiment. As shown in FIG. 6A, a string with beads is displayed on the display 230 of the electronic device 200. In this embodiment, a user of the electronic device 200 can move the beads along the string by contacting locations on the display 230 corresponding to a bead and moving the bead to a new location on the display 230 as shown in FIG. 6B. As the user moves the beads, the display 230 is updated to reflect the new location of the beads on the string.

Moreover, as the user moves a bead and the bead contacts another bead, the haptic output device 240 may output a haptic effect indicating that a collision has occurred. Thus, in one embodiment, one or more first output signals correspond with a vision modality and a haptic modality.

If the display 230 of the electronic device 200 is later turned off or is otherwise disabled such that the user of the electronic device 200 is no longer able to see images on the display 230, then the user may still be able to interact with the electronic device 200 by contacting locations on the display 230 corresponding to a bead and moving the selected bead along the string. As the user moves the beads, the display 230 may not be updated because the display is turned off or otherwise disabled. If, however, a bead collides with another bead, then the haptic output device 240 may output a haptic effect indicating that a collision has occurred. Thus, in one embodiment, one or more second output signals correspond with a haptic modality and does not correspond with a vision modality. A user of the electronic device 200 may be able to determine that a collision has occurred between two beads because both the first output signal and the second output signal corresponds with a haptic modality even though the user cannot view the beads on the display 230 once the display has been turned off or is otherwise disabled. Numerous other embodiments are disclosed herein and variations are within the scope of this disclosure.

Twirling Illustrative Embodiment

Figure 7A:
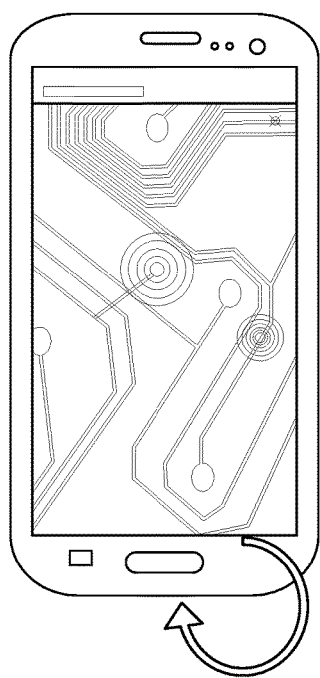
FIG. 7A illustrates aspects of haptic fiddling in accordance with an embodiment.
Figure 7B:
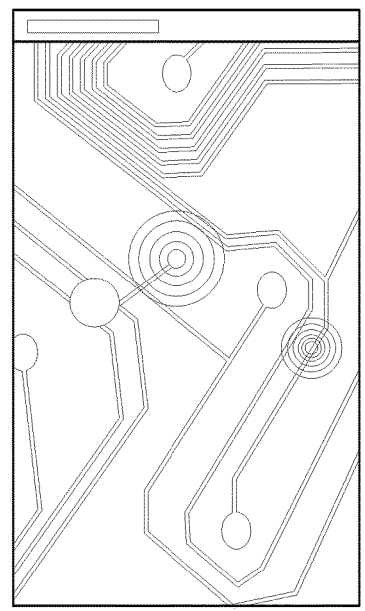
FIG. 7B illustrates aspects of haptic fiddling in accordance with an embodiment.

The embodiments shown in FIGS. 7A and 7B illustrate twirling examples of haptic fiddling according to an embodiment. As shown in FIG. 7A, the display 230 of the electronic device 200 shows a ball that is attached to a chain. In this embodiment, a user can move the whole electronic device 200 to cause the ball to rotate around the chain. As the user moves the whole electronic device 200, the display 230 updates to indicate that the ball is being twirled around the chain. In some embodiments, if a particular rhythm of twirling is established, the haptic output device 240 outputs one or more haptic effects. For example, if the electronic device 200 is twirled in a rhythm such that the ball on the chain makes a complete rotation within a predetermined period of time (e.g., 1 second, 2 second, etc.) or within a predetermined range of times (e.g., each rotation is within 1-5 seconds, etc.) then the haptic output device 240 may output one or more haptic effects. Thus, in embodiments, one or more first output signals corresponds with a vision modality and/or a haptic modality.

If the display 230 of the electronic device 200 is later turned off or is otherwise disabled such that the user of the electronic device 200 is no longer able to see images on the display 230, then the user may still be able to interact with the electronic device 200 by twirling the whole electronic device 200. As the user twirls the electronic device 200, the display 230 may not be updated because the display is turned off or otherwise disabled. If, however, the electronic device 200 is twirled at a particular rhythm, then the haptic output device 240 may output a haptic effect indicating that the particular rhythm has been achieved. For example, if the electronic device 200 is twirled in a rhythm such that the ball on the chain makes a complete rotation within a predetermined period of time (e.g., 1 second, 2 second, etc.) or within a predetermined range of times (e.g., each rotation is within 1-5 seconds, etc.) then the haptic output device 240 may output one or more haptic effects. A user of the electronic device 200 may be able to tell that the ball is being rotated at a particular rhythm based at least in part on the output haptic effects. For example, in one embodiment, the first output signal corresponds to a vision modality and a haptic modality and the second output signal corresponds to a haptic modality. In this embodiment, a user may be able to tell that the ball is being rotated in a particular rhythm even though the second output signal does not correspond to a vision modality as the first output signal did.

FIG. 7B illustrates another twirling example of haptic fiddling according to an embodiment. The embodiment in FIG. 7B is similar to the embodiment shown in FIG. 7A, except that the ball is rotated around the chain differently. In FIG. 7B, a user contacts a location on the touch-sensitive display 230 corresponding to the chain and, while continuing to contact the touch-sensitive display 230, moves to new locations. For example, a user may contact a particular location on the touch-sensitive display 230 corresponding to the chain with a finger and move the finger on the display in a circular pattern to rotate the ball around the chain. The electronic device 200 may output one or more output signals as discussed about with respect to FIG. 7A. For example, if a particular rhythm is achieved, then the electronic device 200 may output one or more output signals to haptic output device 240 to cause the haptic output device to output one or more haptic effects. Numerous other embodiments are disclosed herein and variations are within the scope of this disclosure.

Bubble Wrap Illustrative Embodiment

Figure 8:
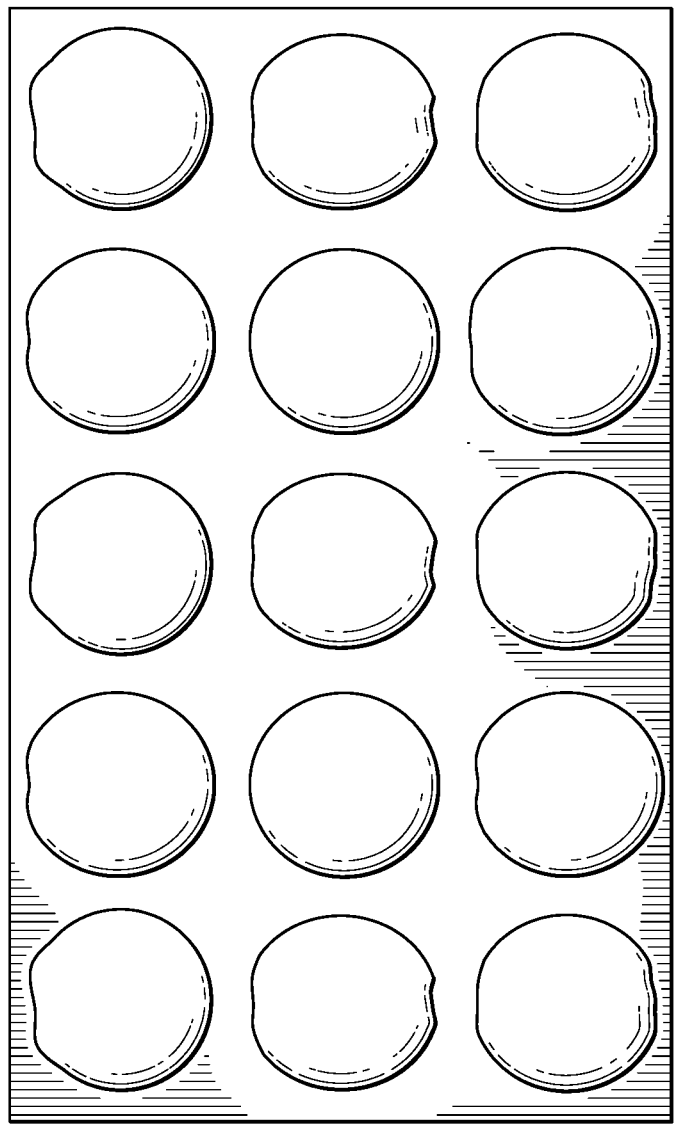
FIG. 8 illustrates aspects of haptic fiddling in accordance with an embodiment.

The embodiment shown in FIG. 8 illustrates a bubble wrap example of haptic fiddling according to an embodiment. As shown in FIG. 8, the display 230 of the electronic device 200 displays an image that visually appears like bubble wrap. In this embodiment, a user can interact with the bubble wrap displayed on display 230 by contacting a location corresponding to one of the bubbles. For example, a user can press a location on display 230 corresponding to a particular bubble displayed on the display 230. In some embodiments, if the user presses the particular bubble hard enough, the bubble will "pop." For example, if a user contact a location on display 230 corresponding to a particular bubble with enough pressure such that the pressure of the contact is above a predetermined threshold, then that particular bubble may "pop." In one embodiment, the electronic device 200 outputs one or more first output signals when a bubble "pops." For example, the electronic device 200 may output a first output signal configured to cause the display 230 to indicate that the bubble has popped and configured to cause haptic output device 240 to output one or more haptic effects to indicate that the bubble has popped. Thus, in one embodiment, the first output signal corresponds with a vision modality and a haptic modality. In some embodiments, a bubble will "pop" each time the bubble is pressed above a predetermined threshold pressure. In other embodiments, a bubble will "pop" only once until an application corresponding to the bubble wrap is restarted or reset. Numerous other embodiments are disclosed herein and variations are within the scope of this disclosure.

If the display 230 of the electronic device 200 is later turned off or is otherwise disabled such that the user of the electronic device 200 is no longer able to see images on the display 230, then the user may still be able to interact with the electronic device 200 by contacting locations on the display 200 corresponding to where a bubble would be displayed if the display 230 was not turned off or otherwise disabled. As the user contacts locations on the display, the display 230 may not be updated because the display is turned off or otherwise disabled. If, however, the user contacts a location of the display 230 corresponding to an "un-popped" bubble with a pressure above a threshold pressure, then the haptic output device 240 may output one or more haptic effects. A user of the electronic device 200 can tell that the bubble has been popped based at least in part on the one or more output signals even though the display 230 does not show that the bubble has been popped. Numerous other embodiments are disclosed herein and variations are within the scope of this disclosure.

Image Interaction Illustrative Embodiment

Figure 9A:
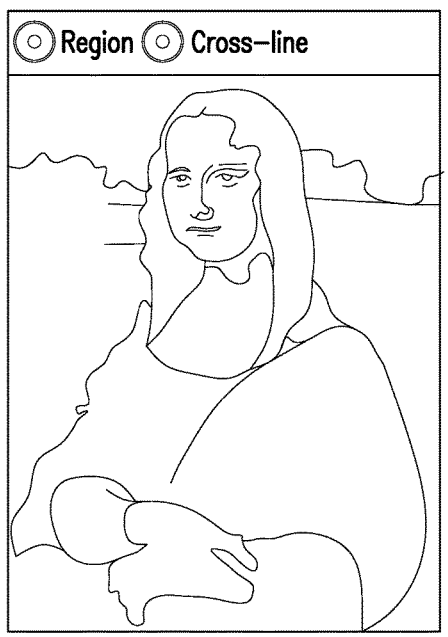
FIG. 9A illustrates aspects of haptic fiddling in accordance with an embodiment.
Figure 9B:
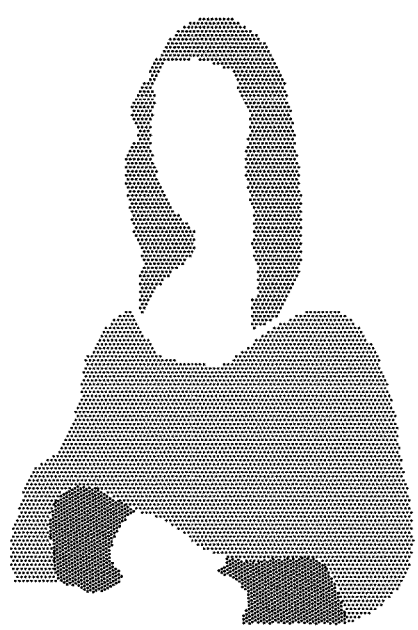
FIG. 9B illustrates aspects of haptic fiddling in accordance with an embodiment.

The embodiment shown in FIGS. 9A and 9B illustrate an image interaction embodiment of haptic fiddling according to an embodiment. As shown in FIG. 9A, the display 230 of the electronic device 200 displays an image. In embodiments, the image may be divided into one or more regions as shown in FIG. 9B. For example, FIG. 9B shows that image shown in FIG. 9A has been divided into three regions (i.e., hair, sleeves, and shirt). In embodiments, a user can interact with one or more of the regions. For example, if a user makes a gesture on the touch-sensitive display 230 in a location corresponding to the region of the image containing the hair, then the electronic device 200 may update the display and/or output a haptic effect to indicate that an interaction with the region of the image containing the hair has occurred. As another example, if a user makes a gesture on the touch-sensitive display 230 in a location corresponding to the region of the image containing the shirt, then the electronic device 200 may update the display and/or output a sound to indicate that an interaction with the region of the image containing the shirt has occurred. Thus, in embodiments, one or more first output signals may correspond with a vision modality, a haptic modality, and/or an audition modality.

If the display 230 of the electronic device 200 is later turned off or is otherwise disabled such that the user of the electronic device 200 is no longer able to see images on the display 230, then the user may still be able to interact with the electronic device 200 by making gestures on the touch-sensitive display 230 where regions of the image would be displayed if the display 230 was not turned off or otherwise disabled. For example, the user may make a gesture on touch-sensitive display 230 at a location corresponding to the region of the image containing the hair. When a gesture is made to a region of the image, one or more haptic effects and/or sounds may be output. For example, a gesture is made at a location corresponding to the region of the image containing the hair, then the electronic device 200 may output a haptic effect. In embodiments, the signal(s) output after the display has been turned off or is otherwise disabled correspond to one or more modalities different than the signal(s) output before the display has been turned off. For example, a first output signal may correspond with a vision modality and a haptic modality and a second output signal after the display has been turned off or otherwise disabled may correspond with only a haptic modality. As another example, a first output signal may correspond with a vision modality and a second output signal after the display has been turned off or otherwise disabled may correspond with a haptic modality. Numerous other embodiments are disclosed herein and variations are within the scope of this disclosure.

Rolling Electronic Device Illustrative Embodiment

Figure 10A:
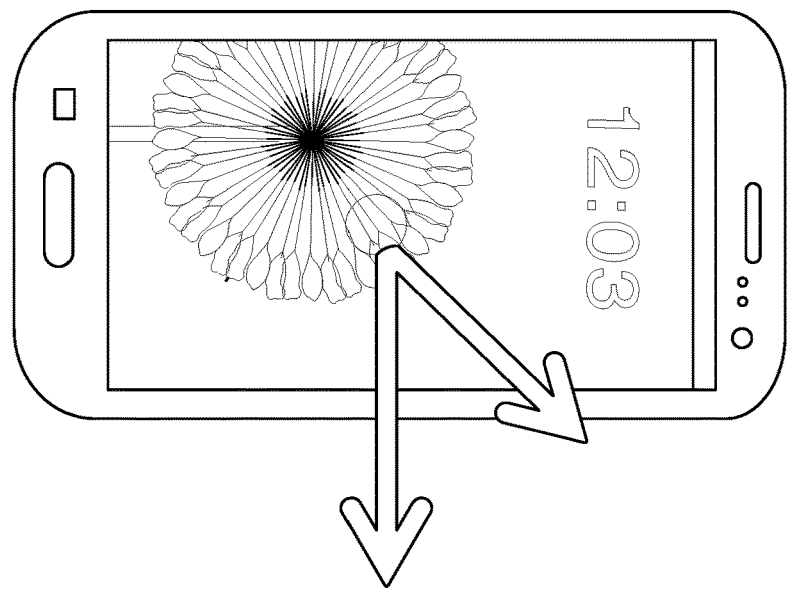
FIG. 10A illustrates aspects of haptic fiddling in accordance with an embodiment.
Figure 10B:
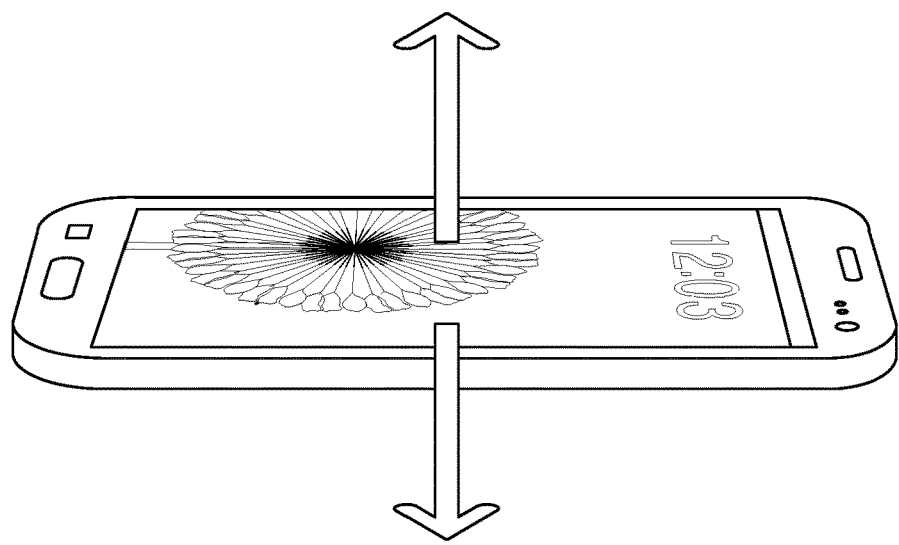
FIG. 10B illustrates aspects of haptic fiddling in accordance with an embodiment.

The embodiment shown in FIGS. 10A and 10B illustrate a rolling interaction embodiment of haptic fiddling according to an embodiment. As shown in FIGS. 10A and 10B, the electronic device 200 can be rolled. For example, a user may roll the electronic device 200 in the user's hand. In one embodiment, when the electronic device 200 achieves a particular orientation, one or more first output signals are output. For example, in one embodiment, the electronic device 200 outputs a first output signal configured to cause haptic output device 240 to output a haptic effect when the display 230 of the electronic device 200 is parallel or perpendicular to the ground. In this embodiment, the haptic effect may be configured to indicate that the electronic device 200 is parallel or perpendicular to the ground. Thus, in one embodiment, a first output signal corresponds with a haptic modality.

In some embodiments, an output device corresponding to a modality may be replaced with another output device corresponding to a different modality. For example, as the user rolls the electronic device 200, a second output signal may be output that is configured to cause a speaker to output a sound. The sound may be configured to indicate that the electronic device 200 is parallel or perpendicular to the ground. Thus, in one embodiment, a second output signal corresponds with an audition modality. Even though different output signals corresponding to different modalities may be used, a user can understand that in both circumstances the electronic device 200 is parallel or perpendicular to the ground. For example, a first output signal corresponding to a haptic modality and a second output signal corresponding to an audition modality may both indicate that the electronic device 200 is parallel or perpendicular to the ground. Thus, both the first output signal and the second output signal is configured to convey analogous information to a user of the electronic device.

General

While the methods and systems herein are described in terms of software executing on various machines, the methods and systems may also be implemented as specifically-configured hardware, such as field-programmable gate array (FPGA) specifically configured to execute the various methods. For example, embodiments can be implemented in digital electronic circuitry, or in computer hardware, firmware, software, or in a combination thereof. In one embodiment, a device may comprise a processor or processors. The processor comprises a computer-readable medium, such as a random access memory (RAM) coupled to the processor. The processor executes computer-executable program instructions stored in memory, such as executing one or more computer programs for editing an image. Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example computer-readable media, that may store instructions that, when executed by the processor, can cause the processor to perform the steps described herein as carried out, or assisted, by a processor. Embodiments of computer-readable media may comprise, but are not limited to, an electronic, optical, magnetic, or other storage device capable of providing a processor, such as the processor in a web server, with computer-readable instructions. Other examples of media comprise, but are not limited to, a floppy disk, CD-ROM, magnetic disk, memory chip, ROM, RAM, ASIC, configured processor, all optical media, all magnetic tape or other magnetic media, or any other medium from which a computer processor can read. The processor, and the processing, described may be in one or more structures, and may be dispersed through one or more structures. The processor may comprise code for carrying out one or more of the methods (or parts of methods) described herein.

The foregoing description of some embodiments of the invention has been presented only for the purpose of illustration and description and is not intended to be exhaustive or to limit the invention to the precise forms disclosed. Numerous modifications and adaptations thereof will be apparent to those skilled in the art without departing from the spirit and scope of the invention.

Reference herein to "one embodiment" or "an embodiment" means that a particular feature, structure, operation, or other characteristic described in connection with the embodiment may be included in at least one implementation of the invention. The invention is not restricted to the particular embodiments described as such. The appearance of the phrase "in one embodiment" or "in an embodiment" in various places in the specification does not necessarily refer to the same embodiment. Any particular feature, structure, operation, or other characteristic described in this specification in relation to "one embodiment" may be combined with other features, structures, operations, or other characteristics described in respect of any other embodiment.

That which is claimed is:

1. A method comprising:
    displaying a user interface on a display of an electronic device, the user interface comprising a plurality of moveable objects associated with a fiddling application;
    receiving a first sensor signal from a first sensor, the first sensor signal indicating a first interaction with one or more of the plurality of moveable objects, wherein the first interaction comprises a touch on a surface of the display;
    modifying the user interface displayed on the display based in part on the first sensor signal;
    deactivating the display;
    after deactivating the display receiving a second sensor signal from a second sensor indicating a second interaction with the electronic device, the second interaction different from the first interaction;
    determining a haptic effect based in part on a collision between two or more of the plurality of movable objects and the second sensor signal, the haptic effect determined based in part on whether the electronic device is parallel or perpendicular to a surface; and
    outputting a haptic signal configured to cause a haptic output device to output the haptic effect.

2. The method of claim 1, wherein the user interface and the haptic effect are configured to convey analogous information to a user.

3. The method of claim 1, wherein the user interface and the haptic effect are configured to express a same mental model to a user.

4. The method of claim 1,
    wherein the display of the electronic device is deactivated after modifying the user interface, and
    wherein the display remains deactivated when the haptic effect is output.

5. The method of claim 1, wherein the second interaction is a shake of the electronic device.

6. The method of claim 1, wherein the first interaction is a first contact on a touch-sensitive input device of the electronic device and wherein the second interaction is a second contact on the touch-sensitive input device of the electronic device.

7. The method of claim 6, wherein at least one of the first contact or the second contact comprises a gesture.

8. The method of claim 6,
    wherein the first sensor signal comprises a first location and a first pressure of the first contact, the first pressure being above a predetermined threshold pressure,
    wherein the second sensor signal comprises a second location and a second pressure of the second contact, the second pressure being above the predetermined threshold pressure, the second location corresponding to the first location.

9. A non-transitory computer-readable medium comprising one or more software applications configured to be executed by a processor, the one or more software applications configured to:
    display a user interface on a display of an electronic device, the user interface comprising a plurality of moveable objects associated with a fiddling application;
    receive a first sensor signal from a first sensor, the first sensor signal indicating a first interaction with one or more of the plurality of moveable objects, wherein the first interaction comprises a touch on a surface of the display;
    modify the user interface displayed on the display based in part on the first sensor signal;
    deactivate the display;
    after deactivating the display, receiving a second sensor signal from a second sensor indicating a second interaction with the electronic device, the second interaction different from the first interaction;
    determine a haptic effect based in part on collision between two or more of the plurality of movable objects and the second sensor signal, the haptic effect determined based in part on whether the electronic device is parallel or perpendicular to a surface; and
    output a haptic signal configured to cause a haptic output device to output the haptic effect.

10. The non-transitory computer-readable medium of claim 9, wherein the second interaction is a shake of the electronic device.

11. The non-transitory computer-readable medium of claim 9, wherein the first interaction is a first contact on a touch-sensitive input device of the electronic device and wherein the second interaction is a second contact on the touch-sensitive input device of the electronic device.

12. The non-transitory computer-readable medium of claim 11, wherein at least one of the first contact or the second contact comprises a gesture.

13. A system, comprising:
    a first sensor;
    a second sensor;
    a display;
    a haptic output device; and
    a processor coupled to the display, the first sensor, the second sensor, and the haptic output device, the processor configured to:

display a user interface on the display the user interface comprising a plurality of moveable objects associated with a fiddling application;

receive a first sensor signal from the first sensor, the first sensor signal indicating a first interaction with one or more of the plurality of moveable objects, wherein the first interaction comprises a touch on a surface of the display;

modify the user interface displayed on the display based in part on the first sensor signal;

deactivate the display;

after deactivating the display receive a second sensor signal from the second sensor indicating a second interaction with an electronic device, the second interaction different from the first interaction;

determine a haptic effect based in part on a collision between two or more of the plurality of movable objects and the second sensor signal, the haptic effect determined based in part on whether the electronic device is parallel or perpendicular to a surface; and output a haptic signal configured to cause the haptic output device to output the haptic effect.

14. The system of claim 13, wherein the user interface and the haptic signal are configured to convey analogous information to a user.

15. The system of claim 13,
wherein the second sensor is a gyroscope,
wherein the second interaction is a movement of the gyroscope, and
wherein outputting the haptic signal does not activate the display.

16. The method of claim 1, wherein the fiddling application is a non-goal oriented activity.

17. The method of claim 1, wherein the fiddling application is executed when the electronic device is busy.

18. The method of claim 1, wherein the fiddling application is executed while the electronic device is downloading information from another device.

19. The method of claim 1, wherein the fiddling application is executed when the electronic device is in a locked mode.

20. The method of claim 1, further comprising providing a second output based on the second interaction and the fiddling application, wherein the second output comprises an effect output using one or more of: a vision modality, an audition modality, a haptic modality, a proprioception modality, a gustation modality, an olfaction modality, a thermoception modality, a nociception modality, or an equilibrioception modality.

21. The method of claim 1, wherein second sensor comprises one or more of: a gyroscope, an accelerometer, an altimeter, a thermometer, an audio sensor, or a photosensor.

22. The non-transitory computer-readable medium of claim 9, further comprising software applications configured to provide a second output based on the second interaction and the fiddling application, wherein the second output comprises an effect output using one or more of: a vision modality, an audition modality, a haptic modality, a proprioception modality, a gustation modality, an olfaction modality, a thermoception modality, a nociception modality, or an equilibrioception modality.

23. The non-transitory computer-readable medium of claim 9, wherein second sensor comprises one or more of: a gyroscope, an accelerometer, an altimeter, a thermometer, an audio sensor, or a photosensor.

24. The system of claim 13, wherein the processor is further configured to provide a second output based on the second interaction and the fiddling application, wherein the second output comprises an effect output using one or more of: a vision modality, an audition modality, a haptic modality, a proprioception modality, a gustation modality, an olfaction modality, a thermoception modality, a nociception modality, or an equilibrioception modality.

25. The system of claim 13, wherein second sensor comprises one or more of: a gyroscope, an accelerometer, an altimeter, a thermometer, an audio sensor, or a photosensor.

* * * * *